US010018898B2

(12) United States Patent
Kadotani et al.

(10) Patent No.: US 10,018,898 B2
(45) Date of Patent: Jul. 10, 2018

(54) PROJECTOR HAVING AN ELECTRO-OPTICAL DEVICE ENCASED IN A HEAT DISSIPATING MOUNTING CASE

(71) Applicant: SEIKO EPSON CORPORATION, Tokyo (JP)

(72) Inventors: Norikazu Kadotani, Matsumoto (JP); Keita Tsukioka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 17 days.

(21) Appl. No.: 15/071,992

(22) Filed: Mar. 16, 2016

(65) Prior Publication Data

US 2016/0282706 A1    Sep. 29, 2016

(30) Foreign Application Priority Data

Mar. 24, 2015  (JP) .................................. 2015-060536

(51) Int. Cl.
*G03B 21/16* (2006.01)
*H04N 9/31* (2006.01)
*G03B 21/00* (2006.01)
*G03B 21/20* (2006.01)

(52) U.S. Cl.
CPC ........... *G03B 21/16* (2013.01); *G03B 21/005* (2013.01); *G03B 21/2073* (2013.01); *H04N 9/3144* (2013.01)

(58) Field of Classification Search
CPC .............................. G03B 21/16; H04N 9/3144
See application file for complete search history.

(56) References Cited

U.S. PATENT DOCUMENTS

| 7,093,960 B2* | 8/2006 | Kojima | G02F 1/133308 348/E9.027 |
| 9,010,941 B2* | 4/2015 | Kadotani | G03B 21/16 353/54 |
| 9,341,929 B2* | 5/2016 | Kadotani | G03B 21/16 |
| 2004/0130897 A1* | 7/2004 | Kojima | G02F 1/133308 362/294 |
| 2013/0148086 A1* | 6/2013 | Kadotani | G03B 21/16 353/61 |
| 2013/0305900 A1 | 11/2013 | Nagatsuma | |

(Continued)

FOREIGN PATENT DOCUMENTS

| CN | 1621284 A | 6/2005 |
| JP | 2001-125057 A | 5/2001 |
| JP | 2003-066534 A | 3/2003 |

(Continued)

*Primary Examiner* — Bao-Luan Le
(74) *Attorney, Agent, or Firm* — Oliff PLC

(57) ABSTRACT

A projector includes a cooling fan that discharges cooling air toward a liquid crystal panel as a target to be cooled, a liquid crystal panel frame that holds the liquid crystal panel, and a turbulence generator that is disposed at an upstream-side end portion of the liquid crystal panel in relation to the cooling air, converts the cooling air into turbulence, and causes the turbulence to flow toward the liquid crystal panel, and the turbulence generator includes an inclined section having an inclined surface and a plate-shaped protruding section formed on the inclined surface and inclined by an inclination angle with respect to a direction in which the cooling air flows into the turbulence generator.

10 Claims, 11 Drawing Sheets

(56) References Cited

U.S. PATENT DOCUMENTS

2015/0192845 A1\* 7/2015 Kadotani ............... G03B 21/16
353/20

FOREIGN PATENT DOCUMENTS

| JP | 2005-153749 A | 6/2005 |
| JP | 2013-120275 A | 6/2013 |
| JP | 2013-242358 A | 12/2013 |

\* cited by examiner

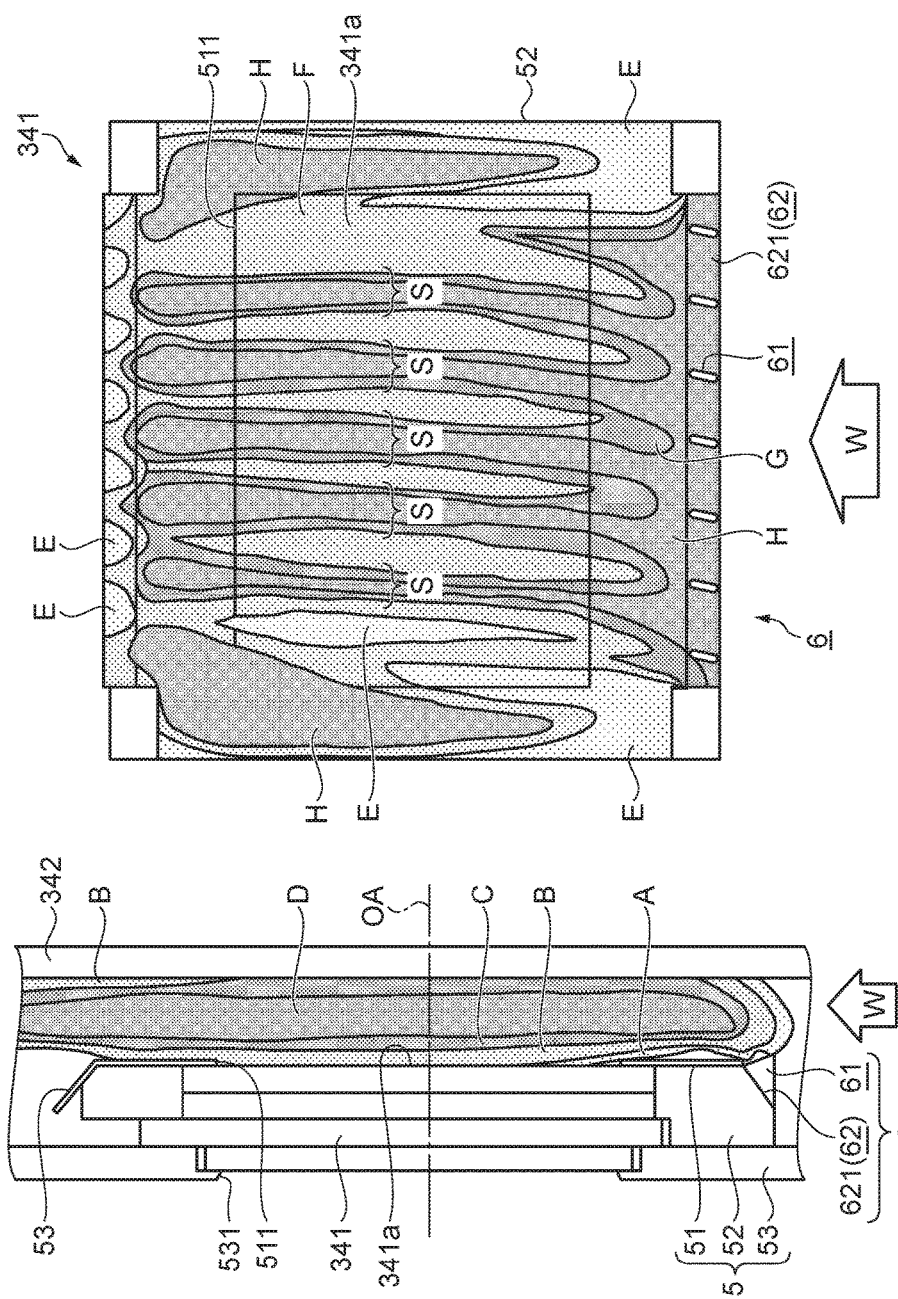

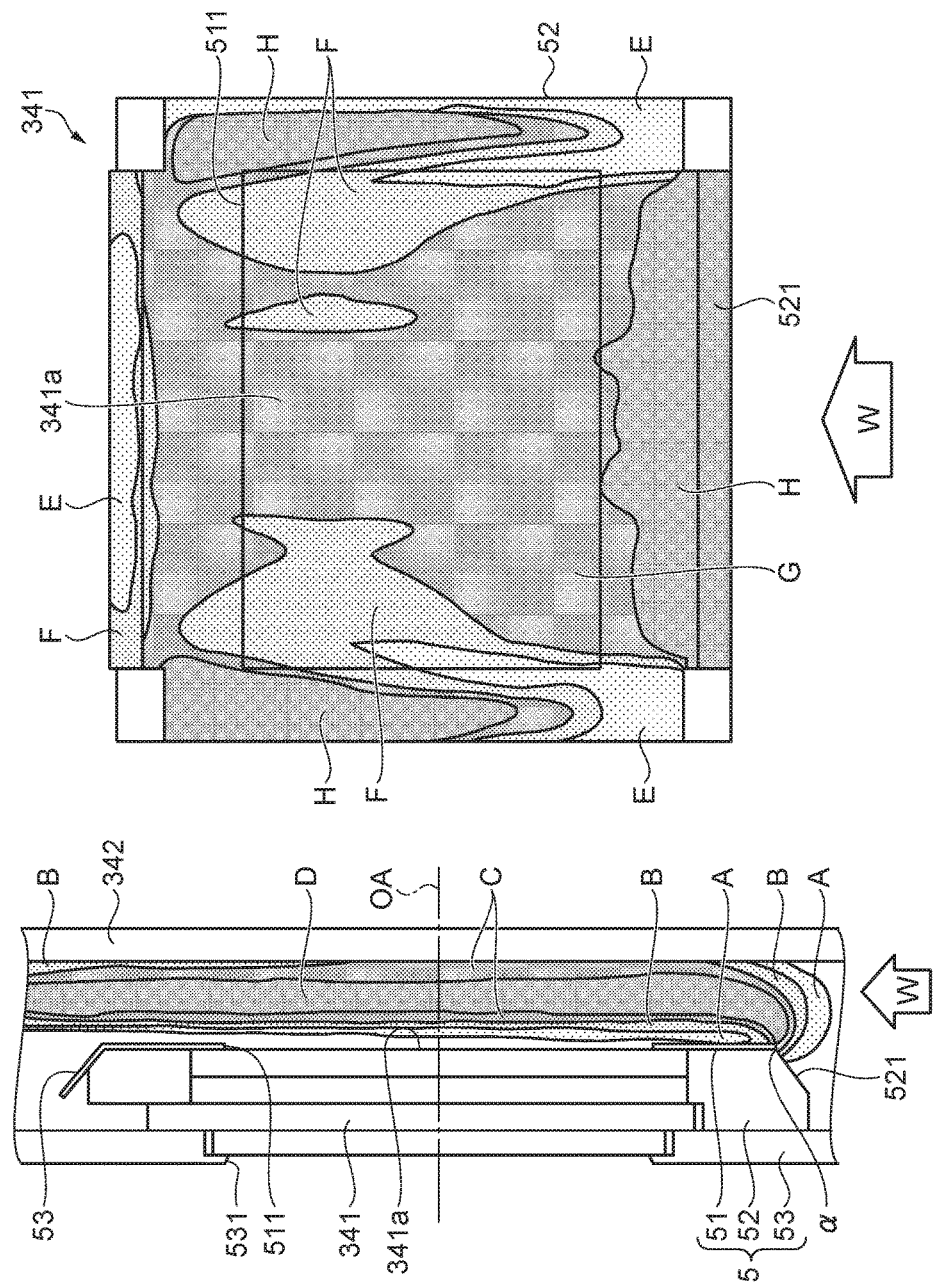

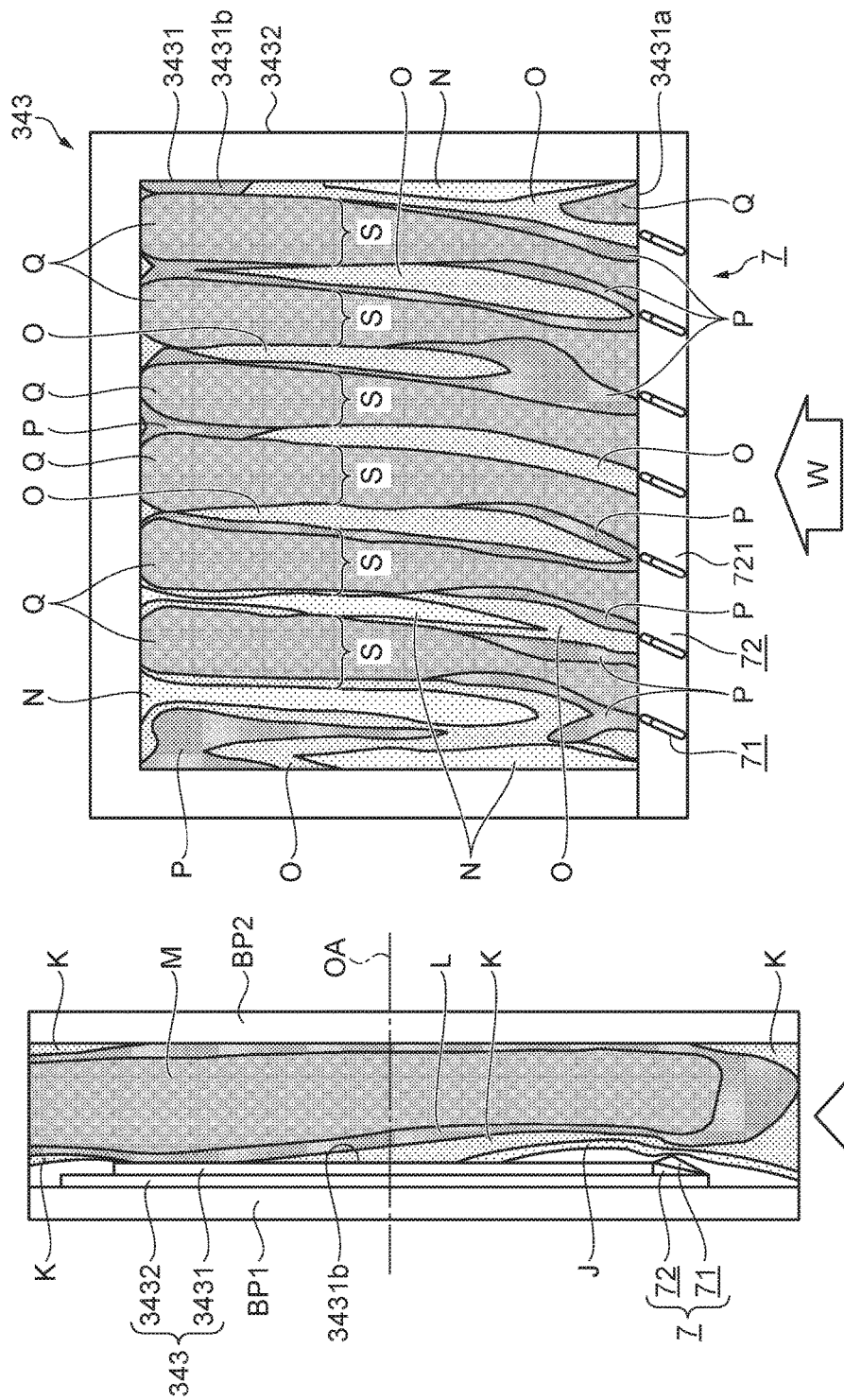

PROJECTOR HAVING AN ELECTRO-OPTICAL DEVICE ENCASED IN A HEAT DISSIPATING MOUNTING CASE

CROSS REFERENCE TO RELATED APPLICATIONS

This application claims priority to Japanese Patent Application No. 2015-060536 filed on Mar. 24, 2015, the entire contents of which are incorporated by reference herein.

BACKGROUND

1. Technical Field

The present invention relates to a projector.

2. Related Art

There is a known projector of related art in which light outputted from a light source apparatus is optically processed through an optical system having a plurality of optical parts and resultant image light is projected. As the light flux outputted from the projector has increased in terms of intensity in recent years, it is necessary to improve optical part cooling performance.

JP-A-2003-66534 discloses that thin wires are disposed between an optical part that requires cooling, such as a light modulator, and a cooling air blow-off port and air is delivered to the thin wires to generate turbulence for cooling the optical part.

In a case where the cooling structure described in JP-A-2003-66534 is used, however, when the gap between a liquid crystal panel as the light modulator and a polarizer is narrowed, for example, swirls of the generated turbulence vanish when they enter the gap so that the turbulence becomes laminar flow, resulting in a thick thermal boundary layer, which makes it difficult to transmit heat to the cooling air, which means that no satisfactory cooling effect is undesirably provided.

Further, depending on the shape of an optical part that requires cooling, such as a liquid crystal panel, how to blow the optical part with cooling air, and other factors, air flow separation occurs around the optical part and prevents the cooling air from flowing along the optical part, undesirably resulting in a decrease in cooling efficiency.

It is therefore desired to provide a projector so configured to suppress air flow separation and achieve a thin thermal boundary layer as to improve optical part cooling efficiency.

SUMMARY

An advantage of some aspects of the invention is to solve at least a part of the problems described above, and the invention can be implemented as the following forms or application examples:

Application Example 1

A projector according to this application example is a projector in which light outputted from a light source apparatus is optically processed through an optical system having a plurality of optical parts and resultant image light is projected, the projector including a cooling fan that discharges cooling air toward any of the optical parts as a target to be cooled, a holding member that holds the optical part, and a turbulence generator that is disposed at an upstream-side end portion of the optical part or the holding member in relation to the cooling air, converts the cooling air into turbulence, and causes the turbulence to flow toward the optical part, and the turbulence generator includes an inclined section having an inclined surface and a plate-shaped protruding section formed on the inclined surface and inclined by an inclination angle with respect to a direction in which the cooling air flows into the turbulence generator.

According to this application example, the turbulence generator includes an inclined section having an inclined surface and a plate-shaped protruding section formed on the inclined surface. Providing the turbulence generator with the inclined section (inclined surface) allows improvement in fluidity of the cooling air when it flows into the turbulence generator, and decreasing a step between the optical part and the inclined section reduces the resistance against the cooling air resulting from the step.

Since the plate-shaped protruding section is inclined by an inclination angle with respect to the flow-in direction of the cooling air, turbulence is generated when the cooling air impinges on the plate-shaped protruding section (side surface of protruding section) and flows therealong. The turbulence causes the cooling air that flows in the vicinity of an exposed surface of the optical part and has a small amount of momentum (flows at low speed) to be mixed with the cooling air that flows in a layer higher than the surface of the optical part and has a large amount of momentum (flows at high speed), resulting in active exchange of momentum. As a result, the thickness of the thermal boundary layer can be reduced, whereby the heat of the optical part is efficiently transmitted to the cooling air for efficient cooling of the optical part.

Further, since the turbulence generator is disposed in an upstream-side end portion of the optical part or the holding member in relation to the cooling air, the turbulence-generated momentum described above keeps being supplied to the cooling air in the vicinity of the surface of the optical part, whereby air flow separation over the surface of the optical part can be suppressed.

Therefore, since the generation of turbulence can suppress air flow separation and can therefore reduce the thickness of the thermal boundary layer, the projector allows improvement in the efficiency at which the optical part, which is a target to be cooled, is cooled.

Application Example 2

In the projector according to the application example described above, it is preferable that the turbulence generator is disposed in a position upstream of an air flow separation point.

According to this application example, since the turbulence generator is disposed in a position upstream of the air flow separation point, the turbulence-generated momentum described above keeps being supplied to the cooling air in the vicinity of the surface of the optical part. As a result, air flow separation is unlikely to occur, and the air flow separation point can be shifted to a position downstream of the surface of the optical part. The occurrence of air flow separation can therefore be suppressed over the surface of the optical part.

Application Example 3

In the projector according to the application example described above, it is preferable that the protruding section is formed of a plurality of protruding sections arranged in a direction perpendicular to the flow-in direction of the cooling air.

According to this application example, since the protruding section of the turbulence generator is formed of a plurality of protruding sections arranged in the direction perpendicular to the flow-in direction of the cooling air, the entire surface of the optical part can be efficiently cooled.

Arranging a plurality of protruding sections as described above allows an increase in flexibility of how to allow the cooling air to flow. For example, when a surface of the optical part has a region that is particularly desired to be cooled (region along which cooling air is desired to flow), use of a plurality of protruding sections allows the cooling air to flow along the region.

Application Example 4

In the projector according to the application example described above, it is preferable that the protruding section is formed in a roughly triangular shape in a side view.

According to this application example, in which the protruding section of the turbulence generator is formed in a roughly triangular shape in a side view, the triangular shape can not only reduce the resistance against the cooling air resulting from the turbulence generator but also efficiently generate turbulence and allow the turbulence to flow. As a result, the turbulence generator allows not only improvement in the generation of turbulence and satisfactory fluidity thereof but also the reduction in the resistance.

Application Example 5

In the projector according to the application example described above, it is preferable that the protruding section is formed under the following conditions: l=2h; and a=15°, where h represents a height of the protruding section protruding from the inclined surface, a represents the inclination angle, and l represents a length of the protruding section in a direction along the inclination angle and the inclined surface.

According to this application example, the protruding section of the turbulence generator is so formed as to satisfy l=2h and a=15°. The thus formed protruding section can not only most efficiently reduce the resistance against the cooling air resulting from the turbulence generator but also efficiently generate turbulence and allow the turbulence to flow. As a result, the turbulence generator most efficiently allows not only the reduction in the resistance but also improvement in the generation of turbulence and satisfactory fluidity thereof.

Application Example 6

In the projector according to the application example described above, it is preferable that the optical part includes a polarizer, a retardation film, a light modulator that modulates the light in accordance with image information, and a polarization converter that aligns polarization directions of the light with one another.

According to this application example, a polarizer, a retardation film, a light modulator, and a polarization converter, each of which generates heat when light (light flux) is incident thereon, can be efficiently cooled, whereby the life of the optical part can be prolonged.

BRIEF DESCRIPTION OF THE DRAWINGS

The invention will be described with reference to the accompanying drawings, wherein like numbers reference like elements.

FIGS. 4A and 4B show a result of a simulation of the speed of cooling air in the case where the light modulator is provided with the turbulence generator according to the first embodiment.

FIGS. 5A and 5B show a result of a simulation of the speed of cooling air in a case where the light modulator is provided with no turbulence generator.

FIGS. 7A and 7B show a result of a simulation of the speed of cooling air in the case where the light-exiting-side polarizers is provided with the turbulence generator according to the second embodiment.

DESCRIPTION OF EXEMPLARY EMBODIMENTS

Embodiments of the invention will be described below with reference to the drawings.

First Embodiment

Figure 1:
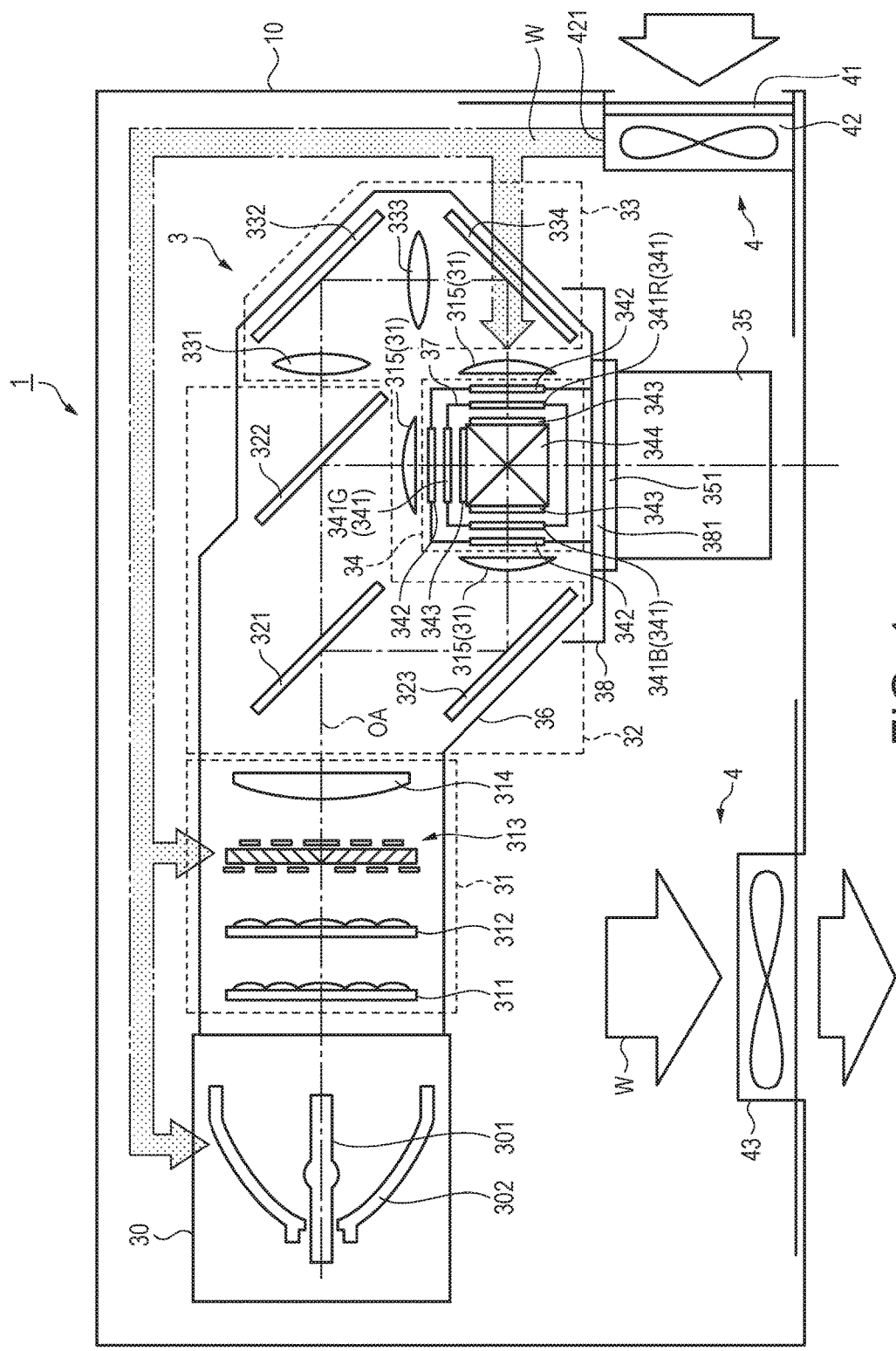
FIG. 1 diagrammatically shows a schematic configuration of a projector according to a first embodiment.

FIG. 1 diagrammatically shows a schematic configuration of a projector 1 according to a first embodiment. FIG. 1 is a diagrammatic view in which the internal configuration of the projector 1 installed on a desktop is viewed from above. FIG. 1 further diagrammatically shows a cooling mechanism 4. The schematic configuration and operation of the projector 1 according to the present embodiment will be described with reference to FIG. 1.

In the following drawings including FIG. 1, it is assumed for ease of description that the traveling direction of light outputted from a light source apparatus 30 and traveling along an illumination optical axis OA is a forward direction (front side), and that the direction opposite the forward direction is a rearward direction (rear side). The front side corresponds to the direction in which light is incident on an optical part and exits out of the optical part, and the rear side corresponds to the direction opposite the direction corresponding to the front side. When viewed along the direction in which light travels, rightward horizontal direction perpendicular to the illumination optical axis OA corresponds to a right side, the direction opposite the direction corresponding to the right side is called a leftward direction (left side). Further, the direction perpendicular to the forward/rearward direction and the rightward/leftward direction and opposite the gravity direction in the desktop installation attitude is called an upward direction (upper side), and the direction opposite the upward direction (gravity direction) is called a downward direction (lower side). In the drawings including FIG. 1, each component is so drawn by using a dimension and a scale different, as appropriate, from actual values as to be large enough to be recognizable on the drawings.

Configuration and Operation of Projector 1

The projector 1 is an apparatus in which light (light flux) outputted from a light source apparatus 30 is modulated by liquid crystal panels 341, which serve as light modulators, in accordance with image information and the modulated light is enlarged and projected as image light via a projection lens 35 on a screen or any other surface (not shown). The projector 1 includes an optical unit 3, a controller (not shown), a power supply unit (not shown) that supplies the controller and other components with electric power, and a cooling mechanism 4, which cools the interior of the projector 1, and the components described above are accommodated in an exterior enclosure 10.

Configuration and Operation of Optical Unit 3

The optical unit 3 operates under the control of the controller and forms the image light in accordance with image information. The optical unit 3 includes the light source apparatus 30, which has an arc tube 301 and reflector 302, and an illumination optical apparatus 31, which has lens arrays 311 and 312, a polarization converter 313, a superimposing lens 314, and parallelizing lenses 315, as shown in FIG. 1. The optical unit 3 further includes a color separation optical apparatus 32, which has dichroic mirrors 321 and 322 and a reflection mirror 323, and a relay optical apparatus 33, which has a light-incident-side lens 331, a relay lens 333, and reflection mirrors 332 and 334.

The optical unit 3 further includes an electro-optical apparatus 34, which has three liquid crystal panels 341 as light modulators (reference character 341R denotes liquid crystal panel for red light (R light), reference character 341G denotes liquid crystal panel for green light (G light), and reference character 341B denotes liquid crystal panel for blue light (B light)), three light-incident-side polarizers 342, three light-exiting-side polarizers 343, and a cross dichroic prism 344 as a light combining optical apparatus. The optical unit 3 further includes the projection lens 35 as a projection optical apparatus that optically processes image light outputted from the electro-optical apparatus 34 and outputs the processed image light. The optical unit 3 further includes an optical part enclosure 36, which accommodates the optical apparatus 30 to 33. The three light-incident-side polarizers 342, which form the electro-optical apparatus 34, are accommodated in the optical part enclosure 36.

In the optical unit 3 having the configuration described above, the color separation optical apparatus 32 separates the light having exited out of the light source apparatus 30 and passed through the illumination optical apparatus 31 into three color light fluxes, R light, G light, and B light. The separated color light fluxes are modulated by the respective liquid crystal panels 341 in accordance with image information to form modulated light fluxes of the three colors. The modulated light fluxes of the three colors are incident on the cross dichroic prism 344 and combined with one another to form image light, which is optically processed through the projection lens 35 and enlarged and projected on the screen or any other surface. Each of the optical apparatus 30 to 35 described above is used as an optical system in a variety of typical projectors and will not therefore be specifically described.

Fixation of Optical Unit 3

In the electro-optical apparatus 34, the light-exiting-side polarizers 343 and the liquid crystal panels 341 are disposed on a color light flux basis on three adjacent side surfaces of the cross dichroic prism 344. The cross dichroic prism 344 is fixed to a fixing substrate 37.

The optical systems include an optical unit fixing section 38, which fixes the entire optical unit 3. The optical unit fixing section 38 is provided with a projection lens fixing section 381, and a flange 351 of the projection lens 35 is fixed to the projection lens fixing section 381. The fixing substrate 37 to which the electro-optical apparatus 34 is fixed is disposed on the optical unit fixing section 38, and the optical part enclosure 36, which accommodates the optical apparatus 30 to 33 in such a way that they sandwich the electro-optical apparatus 34 in three directions, is further disposed on the optical unit fixing section 38. The optical unit fixing section 38 to which the optical unit 3 is fixed is fixed to a lower case (not shown) that forms the exterior enclosure 10.

Configuration of Cooling Mechanism 4

The cooling mechanism 4 includes a dust removing filter 41, a cooling fan 42, a duct (not shown), an exhaust fan 43, and other components. The cooling fan 42 is disposed on an inner-side side surface of the exterior enclosure 10, which is formed in a roughly box-like shape, via the dust removing filter 41. The duct is so disposed as to be connected to a discharge port 421 of the cooling fan 42. The duct is divided into a plurality of ducts that extend to locations close to optical parts that require cooling (objects to be cooled). The exhaust fan 43 is disposed on an inner-side side surface of the exterior enclosure 10.

In the present embodiment, the optical parts to be cooled include the light-incident-side polarizers 342, the light-exiting-side polarizers 343, the liquid crystal panels 341, each of which serves as a light modulator that modulates light in accordance with image information, the polarization converter 313, which aligns the polarization directions of light with one another, and other components. The light source apparatus 30 is also an optical part (light source apparatus) to be cooled.

Operation of Cooling Mechanism 4

When the cooling fan 42 operates, outside air is sucked as cooling air W from the space outside the exterior enclosure 10. The sucked cooling air W exits through the discharge port 421 of the cooling fan 42 and flows into the duct. The duct is so disposed in the present embodiment as to extend to the spaces under the liquid crystal panels 341, the light-exiting-side polarizers 343, and the light-incident-side polarizers 342, which form the electro-optical apparatus 34. In detail, the duct is divided into three ducts in correspondence with the color light fluxes (R light, G light, and B light), and the three ducts have discharge ports (not shown) below the optical elements of the three colors.

The cooling air W having flowed through the divided ducts is discharged out of the discharge ports disposed on a color light flux basis. In the present embodiment, the discharged cooling air W is delivered upward from the spaces below the liquid crystal panels 341, the light-exiting-side polarizers 343, and the light-incident-side polarizers 342 on a color light flux basis. The cooling air W thus draws heat from the heated liquid crystal panels 341, light-exiting-side polarizers 343, and light-incident-side polarizers 342.

The duct is also so disposed in the present embodiment as to be located below the polarization converter 313. The cooling air W discharged out of the discharge port (not shown) of the duct is delivered upward from the space below the polarization converter 313. The cooling air W thus draws heat from the heated polarization converter 313.

When the exhaust fan 43 operates, the cooling air W in the exterior enclosure 10 that has drawn heat from each of the optical parts and has therefore been heated is exhausted out of the exterior enclosure 10. The series of actions described above cool the optical parts. The cooling mechanism 4 in the present embodiment further draws heat generated in circuit blocks (not shown), the power supply unit, and other components that form the controller to cool them.

Figure 2:
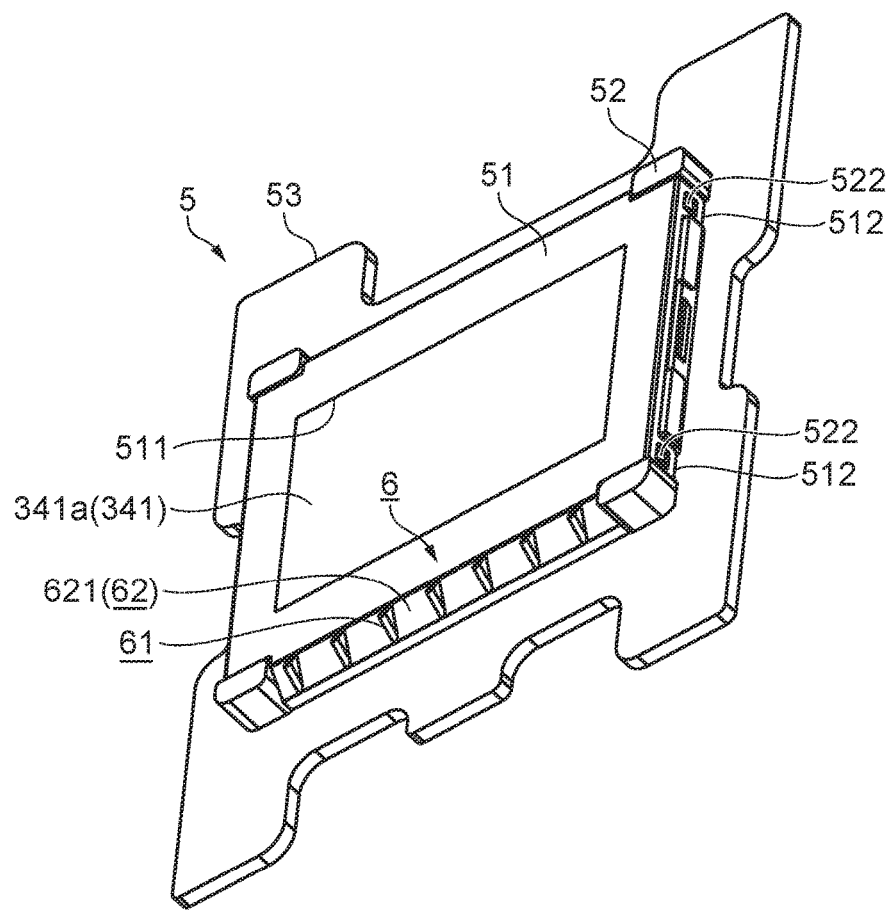
FIG. 2 is a schematic perspective view in which a light modulator provided with a turbulence generator according to the first embodiment is viewed from the modulated light incident side.
Figure 3A:
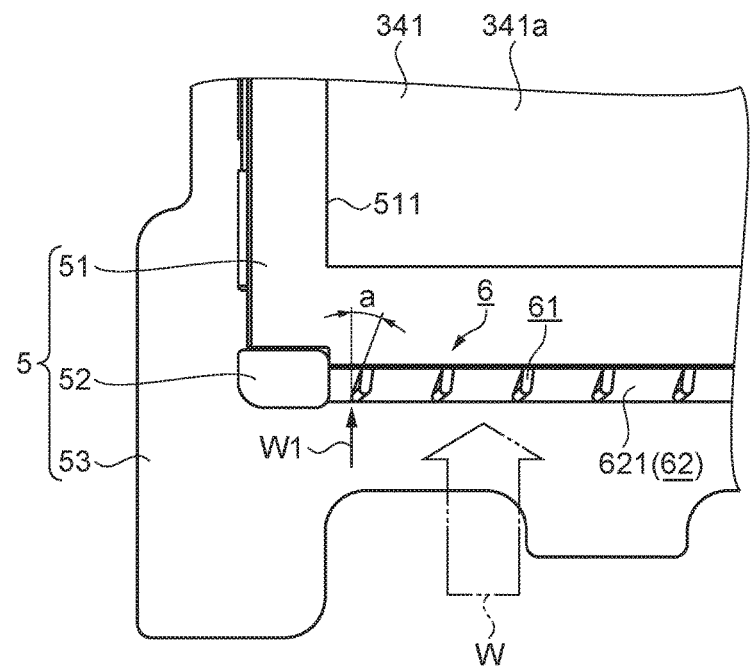
FIGS. 3A and 3B are partially enlarged views showing the light modulator provided with the turbulence generator according to the first embodiment.
Figure 3B:
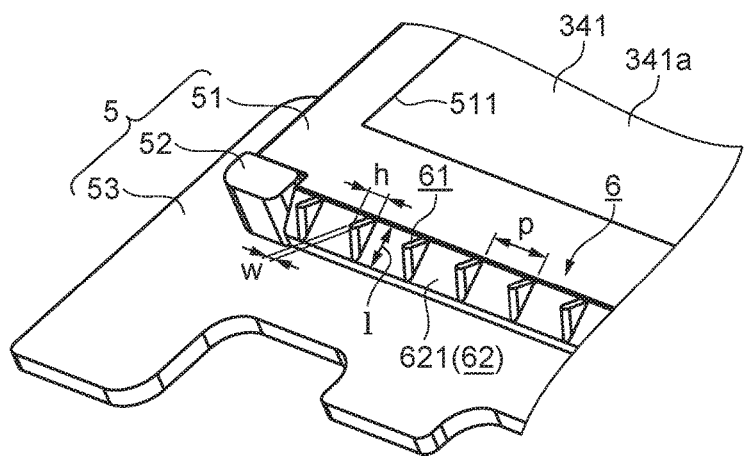

FIG. 2 is a schematic perspective view in which one of the light modulators (liquid crystal panels 341) provided with a turbulence generator 6 according to the first embodiment is viewed from the light incident side. FIGS. 3A and 3B are partially enlarged views showing the light modulator (liquid crystal panel 341) provided with the turbulence generator 6 according to the first embodiment. FIG. 3A is a plan view showing a state in which the turbulence generator 6 is viewed from the flat plane side, and FIG. 3B is a perspective view showing a state in which the turbulence generator 6 is viewed obliquely sideways. The turbulence generator 6 disposed on the light modulator (liquid crystal panel 341) will be described with reference to FIGS. 2, 3A, and 3B.

Configuration of Liquid Crystal Panels 341

Each of the liquid crystal panels 341 includes a device substrate having a pixel electrode (not shown) and a switching device (not shown) connected to the pixel electrode and a counter substrate (not shown) so disposed as to face the device substrate. The liquid crystal panel 341 has a liquid crystal material sealed and encapsulated therein with the liquid crystal material sandwiched between the device substrate and the counter substrate. The liquid crystal panel 341 further includes a dustproof transparent substrate (not shown) on each of the device substrate and the counter substrate.

Configuration of Liquid Crystal Panel Frame 5

A liquid crystal panel frame 5 as a holding member accommodates and holds a liquid crystal panel 341. The liquid crystal panel frame 5 is generally formed of a first frame 51, a second frame 52, and a third frame 53 arranged from the light incident side.

The first frame 51 is disposed on the liquid crystal panel 341 on the side of thereof on which the light from the light source apparatus 30 is incident, is formed of a bent metal plate having a roughly rectangular shape, and holds the light incident side of the liquid crystal panel 341. The first frame 51 has an opening 511 (see FIG. 2) formed therein, through which light is incident. The first frame 51 further has two engaging sections 512, which are bent sections located at the right and left ends of the first frame 51 and engage with protrusions 522 formed on side surfaces of the second frame 52, in which the liquid crystal panel 341 is accommodated, to hold the liquid crystal panel 341. The liquid crystal panel 341 accommodated in the liquid crystal panel frame 5 has a light-incident-side surface 341a, which is exposed through the opening 511 of the first frame 51.

The second frame 52 is formed in a roughly rectangular picture-frame-like shape, accepts the liquid crystal panel 341 from the light incident side and accommodates the liquid crystal panel 341, and has an opening (not shown) on the light exiting side. The second frame 52 and the third frame 53 are bonded to each other to form a unit. The third frame 53 is formed in a roughly rectangular-plate-like shape and holds the light exiting side of the liquid crystal panel 341. An opening 531 (see FIG. 4A), through which the modulated light exits, is formed in a central portion of the third frame 53.

Configuration of Turbulence Generator 6

The turbulence generator 6 is formed on the second frame 52. The turbulence generator 6 is formed of an inclined section 62, which has an inclined surface 621, which forms the lower side of the second frame 52, and protruding sections 61, which are disposed on the inclined surface 621. The turbulence generator 6 is disposed in a lower portion of the second frame 52 and in a position upstream of the liquid crystal panel 341. In detail, the turbulence generator 6 (protruding sections 61) is disposed, with respect to an air flow separation point α, which occurs on the upstream side and will be described later, at an end portion of the second frame 52 that is located further upstream of the air flow separation point α in the present embodiment.

The inclined section 62 (inclined surface 621) is so formed as to decrease the step along the side surface direction (thickness direction) to the liquid crystal panel 341. Each of the protruding sections 61 is formed in a plate-like shape that satisfies the relationship of h>w, that is, the width w of the protruding section 61 in a plan view is smaller than the height thereof in a side view (height h, which will be described later). In detail, each of the protruding sections 61 is formed in a roughly triangular-plate-like shape in a side view. The protruding sections 61 are formed of a plurality of protruding sections arranged in the direction perpendicular to a flow-in direction W1 of the cooling air W. In the present embodiment, 7 protruding sections 61 in total are disposed over the entire region of the inclined surface 621 (entire rightward/leftward region of the opening 511).

The protruding sections 61, each of which has a triangular shape, are formed at an inclination angle a=15° with respect to the flow-in direction W1 of the cooling air W in a plan view, as shown in FIG. 3A. Further, the protruding sections 61 are so formed in the present embodiment that a relationship of l=2h and p=3.3h is satisfied, where "h" represents the height of the protruding sections 61 protruding from the inclined surface 621, "l" represents the length of the protruding sections 61 along the inclined surface 621 (length along inclination angle "a" and inclined surface 621), and "p" represents the intervals (pitches) between the protruding sections 61, as shown in FIG. 3B. In detail, in the present embodiment, the protruding sections 61 are formed under the following conditions: The height h is 1 mm; the length l is 2 mm; the width w is 0.5 mm; and the pitch p is 3.3 mm.

FIGS. 4A and 4B show a result of a simulation of the speed of the cooling air W in the case where the light modulator (liquid crystal panel 341) is provided with the turbulence generator 6 according to the first embodiment. FIG. 4A shows the result in a vertical cross section of the liquid crystal panel 341, and FIG. 4B shows the result in a flat plane in the liquid crystal panel 341. FIG. 4A shows a vertical cross section of a central portion of the liquid crystal panel 341. FIG. 4B shows a plane in the vicinity of the surface 341a, which is a light incident surface on which light incident on the liquid crystal panel 341 is incident.

FIGS. 5A and 5B show a result of a simulation of the speed of the cooling air W in a case where the light modulator (liquid crystal panel 341) is not provided with the turbulence generator 6 (protruding sections 61). FIG. 5A shows the result in a vertical cross section of the liquid crystal panel 341, as in FIG. 4A, and FIG. 5B shows the result in a flat plane in the liquid crystal panel 341, as in FIG. 4B.

FIGS. 5A and 5B show a result of the simulation in a structure of related art and are used for comparison purposes to describe a difference in air speed from the case shown in FIGS. 4A and 4B, where the turbulence generator 6 according to the present embodiment is disposed. The difference in components between the two cases is only whether or not each of the light modulators is provided with the protruding sections 61, which form the turbulence generator 6, and the other configurations are the same in the two cases. The cooling air W for cooling the light modulator is delivered upward from the space below the light modulator as laminar flow (the streamlines of the fluid are parallel to the flow axis of the duct) at the same air speed (about 6 m/s) in the two cases. It is assumed that the cooling air W flows through the gap between the liquid crystal panel 341 and the optical part (light-incident-side polarizer 342) facing the light incident side of the liquid crystal panel 341. The gap is set as about 2 mm.

The air speed in the simulation results shown in FIGS. 4A and 5A is as follows: The air speed A ranges from about 9 to 10 m/s; the air speed B ranges from about 10 to 11 m/s; the air speed C ranges from about 11 to 12 m/s; and the air speed D ranges from about 12 to 13 m/s. The magnitude of the air speed therefore satisfies a relationship A<B<C<D. In practice, the air speed continuously changes, and the air speeds described above are guide values for comparison purposes.

The air speed in the simulation results shown in FIGS. 4B and 5B is as follows: The air speed E ranges from about 2 to 4 m/s; the air speed F ranges from about 4 to 6 m/s; the air speed G ranges from about 6 to 8 m/s; and the air speed H ranges from about 8 to 10 m/s. The magnitude of the air speed therefore satisfies a relationship E<F<G<H. In practice, the air speed continuously changes, and the air speeds described above are guide values for comparison purposes, as described above.

When the light modulator (liquid crystal panel 341) is provided with the turbulence generator 6 (FIG. 4B), the average air speed is 7.5 m/s, and the maximum air speed is 10.2 m/s. In contrast, when the light modulator (liquid crystal panel 341) is not provided with the turbulence generator 6 (FIG. 5B), the average air speed is 7.0 m/s, and the maximum air speed is 9.0 m/s. The results show that providing the light modulator with the turbulence generator 6 improves both the average air speed and the maximum air speed, as compared with the case where the light modulator is not provided with the turbulence generator 6.

Flow of Cooling Air W in the Case where Turbulence Generator 6 is not Provided

In related art in which the turbulence generator 6 (protruding sections 61) is not disposed on an inclined surface 521 of the second frame 52 (corresponding to inclined surface 621 of turbulence generator 6), when the light modulator is blown from below with the cooling air W, an air flow separation point α occurs in the vicinity of the top of the inclined surface 521 in the cross section direction of a central portion of the light modulator, as shown in FIG. 5A. The air flow separation creates a state in which the surface of the light modulator (surface 341a of liquid crystal panel 341), which is located downstream of the air flow separation point α, is unlikely to be blown with the cooling air W. The air flow separation further creates a state in which the air speed decreases over the entire region in the vicinity of the surface 341a of the liquid crystal panel 341, as shown in FIG. 5B. Further, over the surface 341a of the liquid crystal panel 341, the temperature in a central portion is typically higher than the temperatures in the portion therearound and is maximized. Cooling the central portion is therefore an efficient cooling method, but the air flow separation prevents the central portion from being sufficiently cooled, as shown in FIG. 5B.

Flow of Cooling Air W in the Case where Turbulence Generator 6 is Provided

In the present embodiment, in which the turbulence generator 6 is provided (protruding sections 61 are disposed on inclined surface 621 of second frame 52), the cooling air W having flowed from below into the turbulence generator 6 impinges on the side surfaces of the protruding sections 61, which are inclined to the flow-in direction W1 of the cooling air W, and the flow direction of the cooling air W is therefore changed, as shown in FIGS. 2, 3A, 3B, and 4A. At this point, the cooling air W, which is roughly laminar flow, is converted into turbulence, and the turbulence flows toward the downstream side.

The thus produced turbulence supplies momentum to the cooling air W that is present in the vicinity of the surface 341a of the liquid crystal panel 341 and flows at a reduced speed. In detail, the turbulence causes the cooling air W that flows in the vicinity of the surface 341a of the liquid crystal panel 341 and has a small amount of momentum (flow as low speed) to be mixed with the cooling air W that flows in a layer higher than the surface 341a and has a large amount of momentum (flows as high speed), resulting in active exchange of momentum. As a result, the thickness of the thermal boundary layer can be reduced, whereby the heat of the liquid crystal panel 341 is efficiently transmitted from the surface 341a to the cooling air W.

As shown in FIG. 4A, the turbulence generator 6 is disposed in a position upstream (lower side in FIG. 4A) of the air flow separation point α (see FIG. 5A), and the turbulence-generated momentum keeps being supplied to the cooling air W in the vicinity of the surface 341a of the liquid crystal panel 341. As a result, air flow separation is unlikely to occur, and the air flow separation point α can be shifted toward the downstream side (upper side in FIG. 4A). In the present embodiment, no air flow separation occurs, and the cooling air W having a speed approximately equal to the air speed B flows from the lower side to the upper side along the surface 341a of the liquid crystal panel 341, as shown in FIG. 4A.

In the present embodiment, when the turbulence generator 6 is provided, the turbulence generator 6 forms belt-shaped regions where the air speed increases (referred to as speed increase region S in the present embodiment) over the surface 341a of the liquid crystal panel 341, as shown in FIG. 4B. The turbulence generator 6 (protruding sections 61) in the present embodiment are so disposed that the speed increase regions S, where the speed of the cooling air W increases, are formed in a central portion of the surface 341a of the liquid crystal panel 341. In the present embodiment, the speed increase region S formed by each of the protruding sections 61 is formed along the upward/downward direction in a position slightly shifted in an oblique direction from the position where the protruding section 61 is disposed under the influence of the cooling air W that impinges on the protruding section 61 inclined by the inclination angle a and the cooling air W that does not impinge on the protruding section 61 but flows therealong, as shown in FIG. 4B.

According to the embodiment described above, the following advantageous effects are provided.

In the projector 1 according to the present embodiment, the turbulence generator 6, with which each of the light modulators (liquid crystal panels 341) is provided, includes the inclined section 62 having the inclined surface 621 and the plate-shaped protruding sections 61 formed on the inclined surface 621. Providing the turbulence generator 6 with the inclined section 62 (inclined surface 621) allows improvement in fluidity of the cooling air W when it flows into the turbulence generator 6, and decreasing the step between the liquid crystal panel 341 and the inclined section 62 reduces the resistance against the cooling air W resulting from the step.

Since the plate-shaped protruding sections 61 are inclined by the inclination angle a of 15° with respect to the flow-in direction W1 of the cooling air W, turbulence is generated when the cooling air W impinges on the side surfaces of the plate-shaped protruding sections 61 and flows therealong. The turbulence causes the cooling air W that flows in the vicinity of the exposed surface 341a of the liquid crystal panel 341 and has a small amount of momentum (flows at low speed) to be mixed with the cooling air W that flows in a layer higher than the surface 341a of the liquid crystal panel 341 and has a large amount of momentum (flows at high speed), resulting in active exchange of momentum. As a result, the thickness of the thermal boundary layer can be reduced, whereby the heat of the liquid crystal panel 341 is efficiently transmitted to the cooling air W for efficient cooling of the liquid crystal panel 341.

Further, since the turbulence generator 6 is disposed in an end portion of the second frame 52 that is located upstream of the liquid crystal panel 341 along the path of the cooling air W, the turbulence-generated momentum described above keeps being supplied to the cooling air W in the vicinity of the surface 341a of the liquid crystal panel 341, whereby air flow separation over the surface 341a of the liquid crystal panel 341 can be suppressed.

Therefore, since the generation of turbulence can suppress air flow separation and can therefore reduce the thickness of the thermal boundary layer, the projector 1 allows improvement in the efficiency at which the liquid crystal panel 341 is cooled.

In the projector 1 according to the present embodiment, since the turbulence generator 6 is disposed in a position upstream of the air flow separation point α, the turbulence-generated momentum described above keeps being supplied to the cooling air W in the vicinity of the surface 341a of the liquid crystal panel 341. As a result, air flow separation is unlikely to occur, and the air flow separation point α can be shifted to a position downstream of the surface 341a of the liquid crystal panel 341. The occurrence of air flow separation can therefore be suppressed over the surface 341a of the liquid crystal panel 341. The shift of the air flow separation point α toward the downward side allows reduction in air passage resistance, whereby the fluidity of the cooling air W can be improved. As a result, even when the gap through which the cooling air W flows is narrow (when the gap between the liquid crystal panel 341 and a member facing the liquid crystal panel 341 is narrow), the cooling air W readily flow through the gap, whereby the liquid crystal panel 341 can be efficiently cooled even in the case where the gap is narrow.

In the projector 1 according to the present embodiment, in the turbulence generator 6 (protruding sections 61), with which each of the liquid crystal panels 341 as light modulators is provided, a plurality of protruding sections 61 are arranged in the direction perpendicular to the flow-in direction W1 of the cooling air W. The entire surface 341a of the liquid crystal panel 341 can therefore be efficiently cooled. Further, providing a plurality of protruding sections 61 allows the turbulence (corresponding to speed increase regions S in the present embodiment) to flow through a central portion of the surface 341a, where the temperature of the liquid crystal panel 341 increases by a greater amount than the portion around the central portion, in the present embodiment. The flexibility in arranging the protruding sections 61 in such a way that the cooling air W flows to a region intended by a user thus increases. In other words, the flexibility in setting the flow of the cooling air W can be increased.

In the projector 1 according to the present embodiment, each of the protruding sections 61 of the turbulence generator 6, with which each of the liquid crystal panels 341 as light modulators is provided, is formed in a roughly triangular shape in a side view. The triangular shape can not only reduce the resistance against the cooling air W resulting from the protruding section 61 but also efficiently generate turbulence and allow the turbulence to flow. As a result, the turbulence generator 6 allows not only improvement in the generation of turbulence and satisfactory fluidity thereof but also the reduction in the resistance.

In the projector 1 according to the present embodiment, each of the protruding sections 61 of the turbulence generator 6 is so formed as to satisfy l=2h and a=15°, where h represents the height of the protruding section 61 protruding from the inclined surface 621, a represents the inclination angle of the protruding section 61 in a plan view of the liquid crystal panel 341, and l represents the length of the protruding section 61 along the inclination angle a and the inclined surface 621. The thus formed protruding sections 61 can not only most efficiently reduce the resistance against the cooling air W resulting from the turbulence generator 6 but also efficiently generate turbulence and allow the turbulence to flow. As a result, the turbulence generator 6 most efficiently allows not only the reduction in the resistance but also improvement in the generation of turbulence and satisfactory fluidity thereof.

In the projector 1 according to the present embodiment, the turbulence generator 6, with which each of the liquid crystal panels 341 as light modulators is provided, is formed of the inclined section 62 (inclined surface 621) of the liquid crystal panel frame 5, which accommodates the liquid crystal panel 341, and the plate-shaped protruding section 61, which are formed on the inclined surface 621. Further, each of the protruding sections 61 may be formed in a triangular-plate-like shape. The turbulence generator 6 for efficient cooling can thus be achieved in a simple configuration.

In the projector 1 according to the present embodiment, since the turbulence generator 6, with which each of the liquid crystal panels 341 is provided, improves the efficiency at which the liquid crystal panel 341 is cooled and therefore eliminates necessity of an increase in drive voltage of the cooling fan 42, the magnitude of noise produced when the cooling fan 42 is driven can be lowered.

In the projector 1 according to the present embodiment, since the turbulence generator 6, with which each of the liquid crystal panels 341 is provided, improves the cooling efficiency, a situation in which the liquid crystal panel 341 is heated to a high temperature can be avoided. The life of the liquid crystal panel 341 can therefore be prolonged.

In a case where the output of the light source apparatus 30 and the number of pixels of the liquid crystal panels 341 are fixed but the size of the liquid crystal panels 341 varies, a smaller liquid crystal panel 341 has higher heat density than a large liquid crystal panel 341 and is therefore more likely to generate heat. However, since the turbulence generator 6 according to the present embodiment can improve the cooling efficiency, the size of the liquid crystal panels 341 can be reduced, whereby the size and weight of the projector 1 can be reduced.

Second Embodiment

Figure 6A:
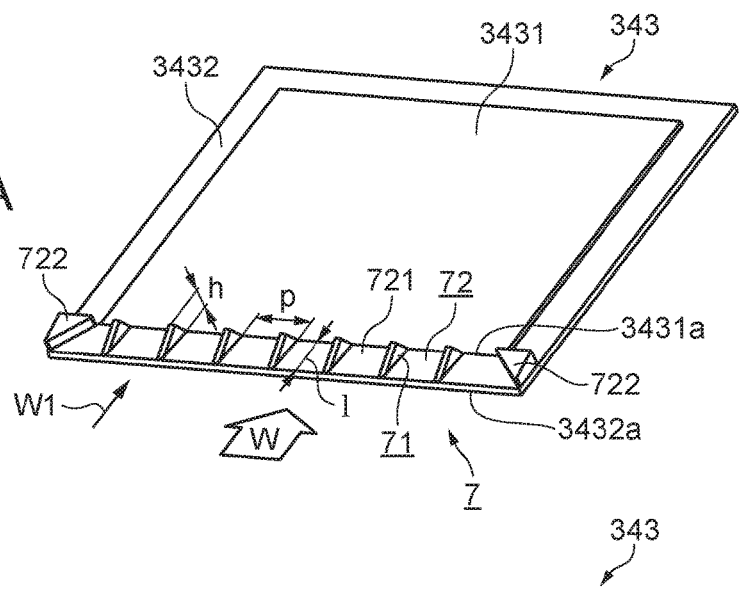
FIGS. 6A to 6C show that a light-exiting-side polarizer is provided with a turbulence generator according to a second embodiment.
Figure 6B:
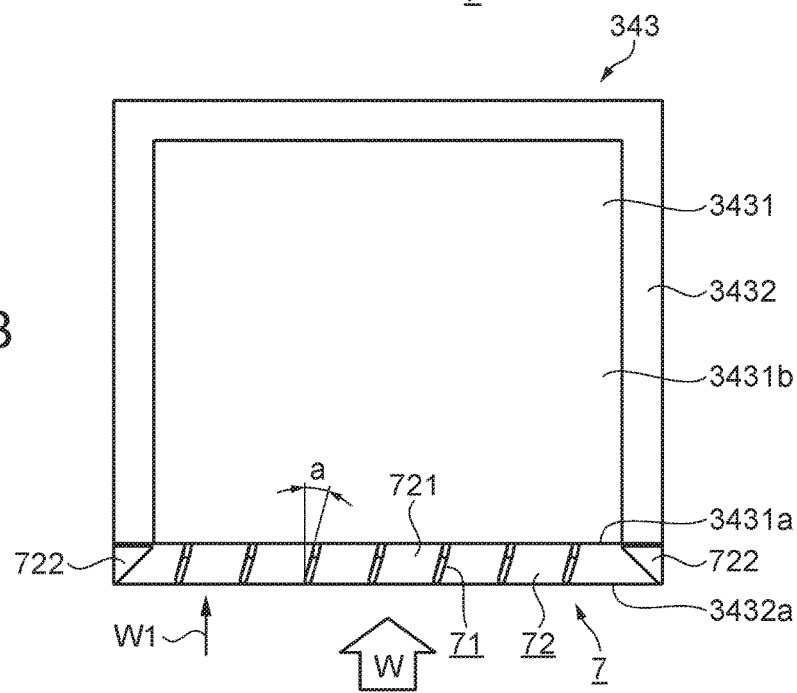
Figure 6C:
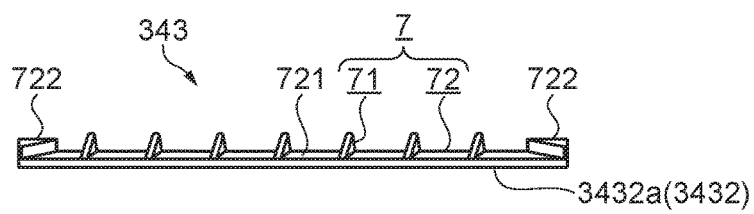

FIGS. 6A to 6C show that each of the light-exiting-side polarizers 343 is provided with a turbulence generator 7 according to a second embodiment. FIG. 6A is a perspective view, FIG. 6B is a plan view, and FIG. 6C is a side view viewed from the lower side. The turbulence generator 7 according to the present embodiment is disposed on the light incident side of the light-exiting-side polarizer 343 on which the modulated light outputted from the liquid crystal panel 341 is incident.

Configuration of Light-Exiting-Side Polarizers 343

Each of the light-exiting-side polarizers 343 is formed of a polarizer main body 3431, which is formed of a film-shaped organic polarizer, and a light transmissive substrate (transparent glass plate 3432 in the present embodiment) to which the light exiting side of the polarizer main body 3431 is attached.

Configuration of Turbulence Generator 7

The turbulence generator 7 according to the present embodiment is formed of a plate-shaped inclined section 72, which has an inclined surface 721 so formed as to be inclined with respect to the light-exiting-side polarizer 343, and plate-shaped protruding sections 71 formed on the inclined surface 721. The protruding sections 71 and the inclined section 72 are formed integrally with each other in injection molding using a synthetic resin material. The turbulence generator 7 is disposed in (stuck on) a region between a lower end portion 3432a of the glass plate 3432 and a lower end portion 3431a of the polarizer main body 3431 attached to the glass plate 3432, as shown in FIGS. 6A to 6C.

In detail, the inclined surface 721 of the inclined section 72 has a rectangular shape, and the thickness of the inclined section 72 gradually increases with distance from the lower end portion 3432a of the glass plate 3432 toward the lower end portion 3431a of the polarizer main body 3431. The thickness of the thickest portion of the inclined surface 721 is set to be equal to the thickness of the lower end portion 3431a of the polarizer main body 3431. The protruding sections 71 are disposed on the thus configured inclined surface 721. The inclined section 72 has protrusions 722 located at the right and left ends thereof, and the protrusions 722 are so inclined as to cause the cooling air W flowing from the upstream side (lower side in FIG. 6B) to the downstream side (upper side in FIG. 6B) and passing through the right and left ends to flow toward the inner portion of the light-exiting-side polarizer 343.

Configuration of Protruding Sections 71

The protruding sections 71 are disposed on the inclined surface 721 and formed as plate-like, roughly triangular-shaped protruding sections 71, as shown in FIGS. 6A to 6C, roughly in the same manner as the protruding sections 61 of the turbulence generator 6 in the first embodiment are formed. The protruding sections 71 are so formed as to be inclined by the inclination angle a of 15° with respect to the flow-in direction W1 of the cooling air W flows in a plan view, as shown in FIG. 6B. Further, the protruding sections 71 are so formed as to satisfy the relationship l=2h and p=3.3h, where "h" represents the height of the protruding sections 71 protruding from the inclined surface 721, "l" represents the length of the protruding sections 71 along the inclined surface 721, and "p" represents the pitches between the protruding sections 71, as shown in FIG. 6A, as in the case of the protruding sections 61 in the first embodiment. In the present embodiment, 7 protruding sections 71 in total are arranged over the entire rightward/leftward region of the polarizer main body 3431.

FIGS. 7A and 7B show a result of a simulation of the speed of the cooling air W in the case where each of the light-exiting-side polarizers 343 is provided with the turbulence generator 7 according to the second embodiment. FIG. 7A shows the result in a vertical cross section of the light-exiting-side polarizer 343, and FIG. 7B shows the result in a flat plane in the light-exiting-side polarizer 343. FIG. 7A shows a vertical cross section of a central portion of the light-exiting-side polarizer 343. FIG. 7B shows a plane in the vicinity of the surface 3431b of the light-exiting-side polarizer 343 (polarizer main body 3431) on which modulated light is incident.

Figure 8B:
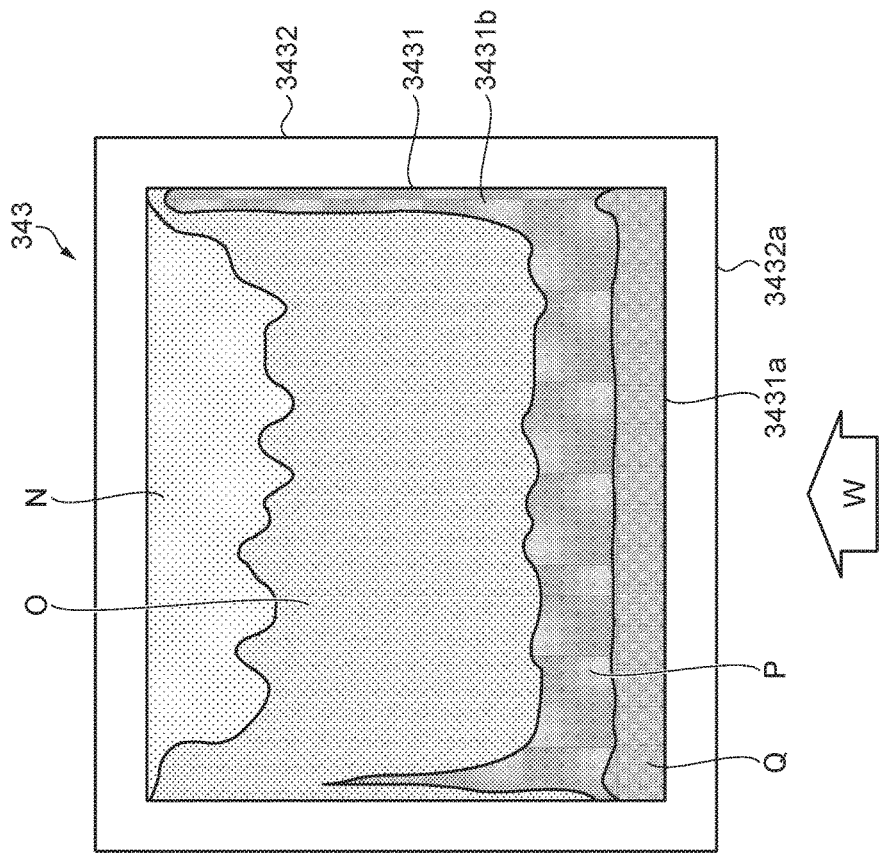
FIGS. 8A and 8B show a result of a simulation of the speed of cooling air in a case where the light-exiting-side polarizer is provided with no turbulence generator.
Figure 8A:
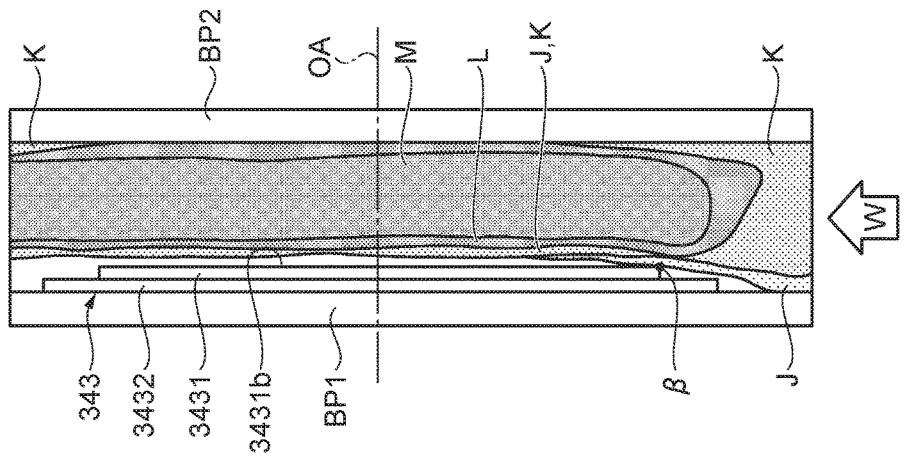

FIGS. 8A and 8B show a result of a simulation of the speed of the cooling air W in a case where each of the light-exiting-side polarizers 343 is not provided with the turbulence generator 7 (protruding sections 71). FIG. 8A shows the result in a vertical cross section of the light-exiting-side polarizer 343, as in FIG. 7A, and FIG. 8B shows the result in a flat plane in the light-exiting-side polarizers 343, as in FIG. 7B.

FIGS. 8A and 8B show a result of the simulation in a structure of related art and are used for comparison purposes to describe a difference in air speed from the case shown in FIGS. 7A and 7B, where the turbulence generator 7 according to the present embodiment is disposed. The difference in components between the two cases is only whether or not each of the light-exiting-side polarizers 343 is provided with the turbulence generator 7, and the other configurations are the same in the two cases. In FIGS. 7A and 7B and FIGS. 8A and 8B, substrates BP1 and BP2 are disposed to form a channel for the simulation. The glass plate 3432 is fixed to the substrate BP1. The cooling air W for cooling the light-exiting-side polarizer 343 is delivered upward from the space below the light-exiting-side polarizer 343 as laminar flow at the same air speed (about 6 m/s) in the two cases. It is assumed that the cooling air W flows through the gap between the light-exiting-side polarizer 343 and the optical part (liquid crystal panel 341) facing the light incident side of the light-exiting-side polarizer 343. The size of the gap is set as about 2 mm.

The air speed in the simulation results shown in FIGS. 7A and 8A is as follows: The air speed J ranges from about 5 to 7 m/s; the air speed K ranges from about 7 to 8 m/s; the air speed L ranges from about 8 to 9 m/s; and the air speed M ranges from about 9 to 10 m/s. The magnitude of the air speed therefore satisfies a relationship J<K<L<M. In practice, the air speed continuously changes, and the air speeds described above are guide values for comparison purposes.

The air speed in the simulation results shown in FIGS. 7B and 8B is as follows: The air speed N ranges from about 1.5 to 3.5 m/s; the air speed O ranges from about 3.5 to 4.5 m/s; the air speed P ranges from about 4.5 to 5.5 m/s; and the air speed Q ranges from about 5.5 to 6.5 m/s. The magnitude of the air speed therefore satisfies a relationship N<O<P<Q. In practice, the air speed continuously changes, and the air speeds described above are guide values for comparison purposes, as described above.

When each of the light-exiting-side polarizers 343 is provided with the turbulence generator 7 (FIG. 7B), the average air speed is 5.2 m/s, and the maximum air speed is 8.7 m/s. In contrast, when each of the light-exiting-side polarizers 343 is not provided with the turbulence generator 7 (FIG. 8B), the average air speed is 4.1 m/s, and the maximum air speed is 7.6 m/s. The results show that providing each of the light-exiting-side polarizers 343 with the turbulence generator 7 improves both the average air speed and the maximum air speed, as compared with the case where each of the light-exiting-side polarizers 343 is not provided with the turbulence generator 7.

Flow of Cooling Air W in the Case where Turbulence Generator 7 is not Provided In related art in which each of the light-exiting-side polarizers 343 is not provided with the turbulence generator 7 (protruding sections 71), when the light-exiting-side polarizer 343 is blown from below with the cooling air W, an air flow separation point β occurs at the lower end portion 3431*a* of the polarizer main body 3431 in a cross section direction of a central portion of the light-exiting-side polarizer 343, as shown in FIG. 8A. The air flow separation creates a state in which the surface 3431*b* of the polarizer main body 3431, which is located downstream of the air flow separation point β, is unlikely to be blown with the cooling air W. The air flow separation further creates a state in which the air speed decreases over the entire region in the vicinity of the surface 3431*b* of the polarizer main body 3431, as shown in FIG. 8B. Further, over the surface 3431*b* of the light-exiting-side polarizer 343 (polarizer main body 3431), the temperature in a central portion is typically higher than the temperatures in the portion therearound and is maximized. Cooling the central portion is therefore an efficient cooling method, but the air flow separation prevents the central portion from being sufficiently cooled, as shown in FIG. 8B.

Flow of Cooling Air W in the Case where Turbulence Generator 7 is Provided

In the present embodiment, where each of the light-exiting-side polarizers 343 is provided with the turbulence generator 7, the cooling air W having flowed from below into the turbulence generator 7 impinges on the side surfaces of the protruding sections 71, which are inclined to the flow-in direction W1 of the cooling air W, and the flow direction of the cooling air W is therefore changed, as shown in FIGS. 6A, 6B, and 7A. At this point, the cooling air W, which is roughly laminar flow, is converted into turbulence, and the turbulence flows toward the downstream side.

The thus produced turbulence supplies momentum to the cooling air W that is present in the vicinity of the surface 3431*b* of the polarizer main body 3431 and flows at a reduced speed. The effect of the flow of the turbulence is the same as that in the first embodiment and will therefore not be described. As a result, the thickness of the thermal boundary layer can be reduced, whereby the heat of the polarizer main body 3431 is efficiently transmitted from the surface 3431*b* to the cooling air W.

As shown in FIG. 7A, the turbulence generator 7 is disposed in a position upstream (lower side in FIG. 7A) of the air flow separation point β (see FIG. 8A), and the turbulence-generated momentum keeps being supplied to the cooling air W in the vicinity of the surface 3431*b* of the polarizer main body 3431. As a result, air flow separation is unlikely to occur, whereby the air flow separation point β can be shifted toward the downstream side (upper side in FIG. 7A). In the present embodiment, no air flow separation occurs, and the cooling air W having a speed approximately equal to the air speed K or L flows from the lower side to the upper side along the surface 3431*b* of the polarizer main body 3431, as shown in FIG. 7A. Further, a plurality of speed increase regions S are formed in correspondence with the protruding sections 71 also in the present embodiment, as in the first embodiment.

According to the present embodiment, the following advantageous effects are provided as well as the same advantageous effects as those provided by the first embodiment.

In the projector 1 according to the present embodiment, the turbulence generator 7, with which each of the light-exiting-side polarizers 343 is provided, is formed of the inclined section 72 and the protruding sections 71 formed on the inclined section 72. Each of the light-exiting-side polarizers 343 can be readily provided with the turbulence generator 7 by attaching the turbulence generator 7 on the glass plate 3432, which holds the film-shaped polarizer main body 3431. The thus configured turbulence generator 7 allows improvement in formability of the turbulence generator 7 and adaptability to the location where the turbulence generator 7 is disposed.

Third Embodiment

Figure 9A:
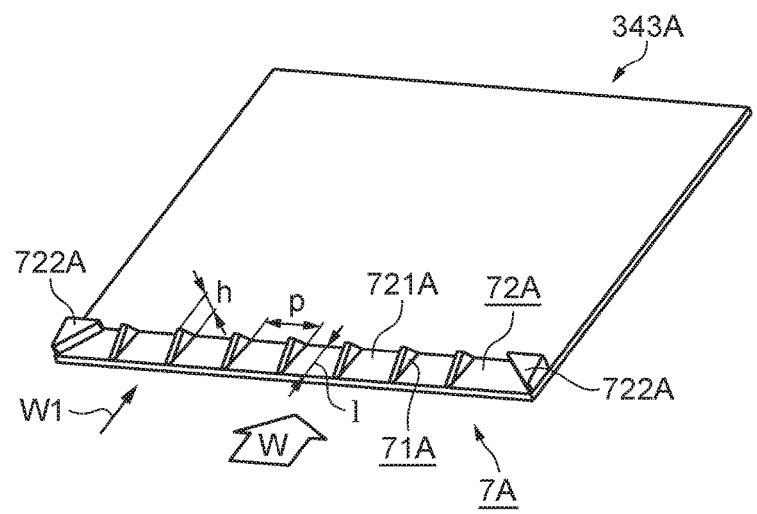
FIGS. 9A to 9C show that a light-exiting-side polarizer is provided with a turbulence generator according to a third embodiment.
Figure 9B:
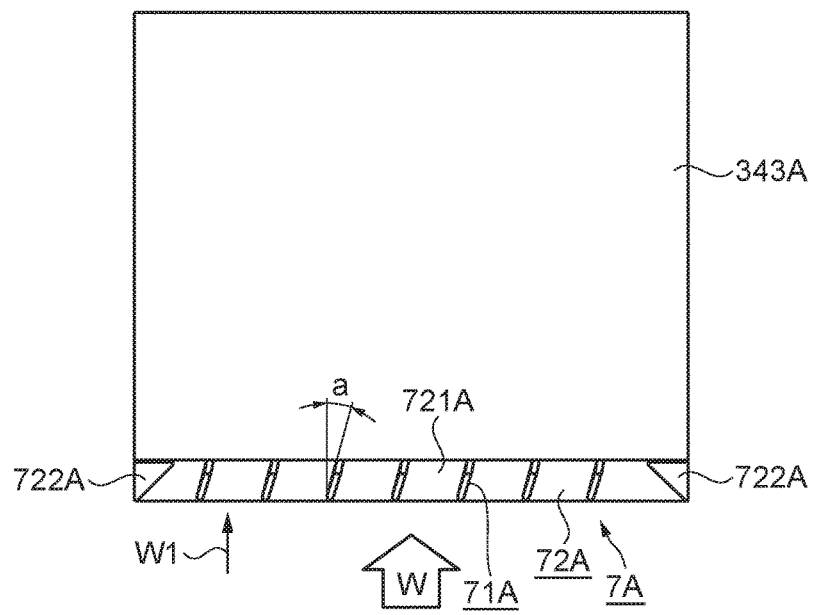
Figure 9C:
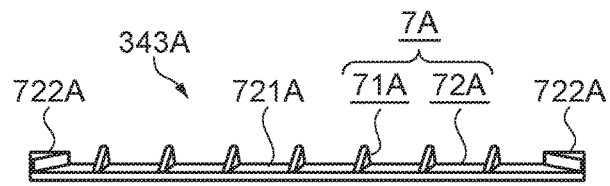

FIGS. 9A to 9C show that each light-exiting-side polarizer 343A is provided with a turbulence generator 7A according to a third embodiment. FIG. 9A is a perspective view, FIG. 9B is a plan view, and FIG. 9C is a side view viewed from the lower side. The turbulence generator 7A according to the present embodiment is disposed on the light incident side of the light-exiting-side polarizer 343A on which the modulated light outputted from the liquid crystal panel 341 is incident.

The present embodiment differs from the second embodiment in that a transmissive, inorganic polarizer as each of the light-exiting-side polarizers 343 is provided with the turbulence generator 7A. In the following description, the light-exiting-side polarizers 343 in the second embodiment are replaced with the light-exiting-side polarizers 343A.

Configuration of Light-Exiting-Side Polarizers 343A

Each of the light-exiting-side polarizers 343A in the present embodiment has a configuration having a wire grid layer in which a large number of minute linear ribs made, for example, of aluminum are arranged in parallel on a quartz glass substrate. Each of the light-exiting-side polarizers 343A transmits polarized light polarized in the direction perpendicular to the direction in which the linear ribs extend and absorbs polarized light polarized in the direction parallel to the direction in which the linear ribs extend.

Configuration of Turbulence Generator 7A

The present embodiment employs the turbulence generator 7A configured in the same manner as the turbulence generator 7 in the second embodiment is configured. In detail, the turbulence generator 7A in the present embodiment is formed of a plate-shaped inclined section 72A, which has an inclined surface 721A so formed as to be inclined with respect to the light-exiting-side polarizer 343A, and a plate-shaped protruding section 71A, which are formed on the inclined surface 721A. The protruding sections 71A in the present embodiment correspond to the protruding sections 71 in the second embodiment, and the inclined section 72A in the present embodiment corresponds to the inclined section 72 in the second embodiment. Further, the inclined surface 721A and protrusions 722A in the present embodiment correspond to the inclined surface 721 and the protrusions 722 in the second embodiment. The turbulence generator 7A is disposed on a lower end portion of the surface each of the light-exiting-side polarizers 343A (light incident surface on which modulated light is incident in the present embodiment) opposite the surface thereof on which the wire grid layer is formed.

The flow of the cooling air W resulting from the configuration in which each of the light-exiting-side polarizers 343A, each of which is formed of an inorganic polarizer, is provided with the turbulence generator 7A is roughly the same as that in the second embodiment and is therefore not described. The configuration in which each of the light-exiting-side polarizers 343A is provided with the turbulence generator 7A allows provision of the same advantageous effects provided by the second embodiment.

Fourth Embodiment

Figure 10A:
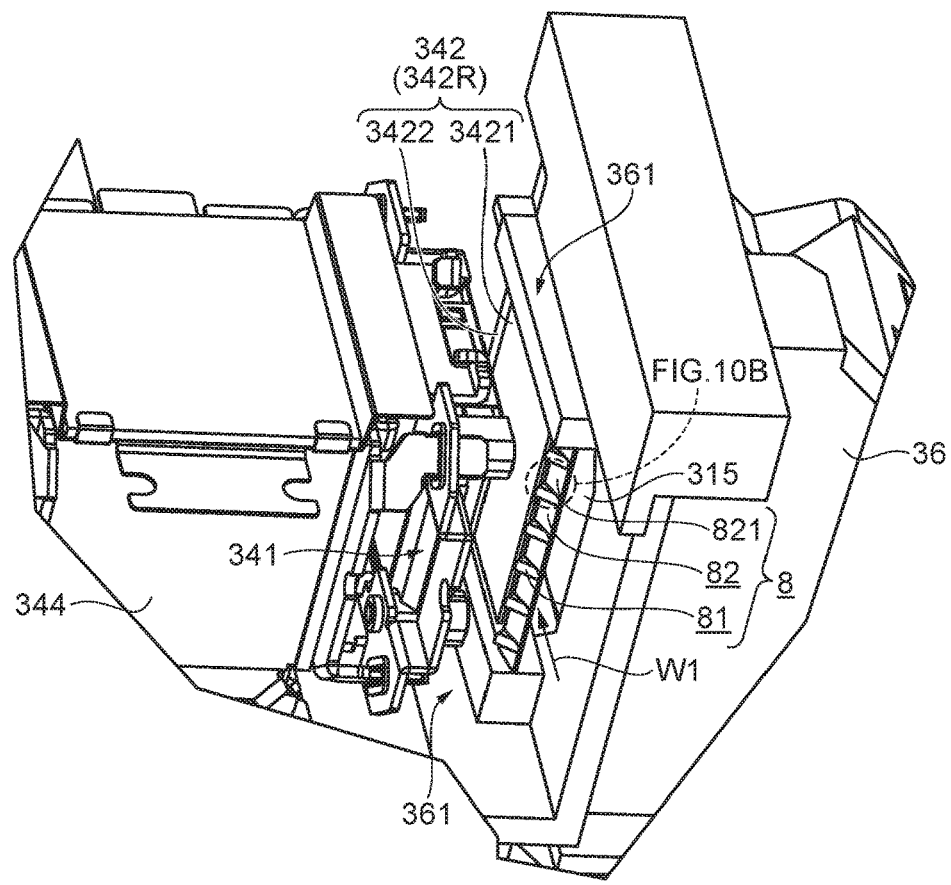
FIGS. 10A and 10B show that an optical part enclosure is provided with a turbulence generator according to a fourth embodiment.
Figure 10B:
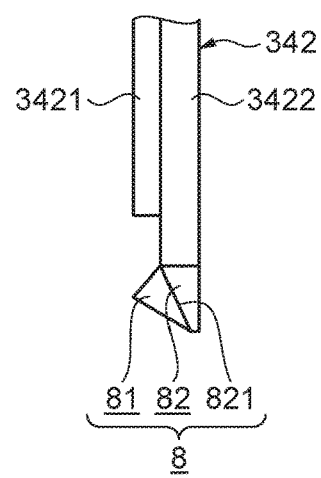

FIGS. 10A and 10B show that the optical part enclosure 36 is provided with a turbulence generator 8 according to a fourth embodiment. FIG. 10A is a perspective view in which the turbulence generator 8 is viewed from obliquely below, and FIG. 10B is an enlarged cross-sectional view of the turbulence generator 8.

The turbulence generator 8 in the present embodiment is disposed in the optical part enclosure 36, as shown in FIGS. 10A and 10B. In detail, the turbulence generator 8 is disposed in a lower region of the optical part enclosure 36 that accommodates the light-incident-side polarizers 342. In FIGS. 10A and 10B, a light-incident-side polarizer 342R for R light is shown as the light-incident-side polarizers 342 for ease of description. The turbulence generator 8 is disposed not only in the lower region that accommodates the light-incident-side polarizer 342R for R light but also in lower regions that accommodate a light-incident-side polarizer 342G for G light and a light-incident-side polarizer 342B for B light, and all the light-incident-side polarizers 342 are cooled.

The light-incident-side polarizers 342, which form the electro-optical apparatus 34, are accommodated in a front end portion of the optical part enclosure 36. The liquid crystal panel 341 and the light-exiting-side polarizers 343, which also form the electro-optical apparatus 34, are disposed on the cross dichroic prism 344. The cross dichroic prism 344 is fixed to the fixing substrate 37 (not shown in FIG. 10A or 10B).

Configuration of Light-Incident-Side Polarizers 342

Each of the light-incident-side polarizers 342 in the present embodiment is formed of an organic polarizer and configured in roughly the same manner as each of the light-exiting-side polarizers 343 (polarizer main body 3431 and glass plate 3432) in the second embodiment is formed. In detail, each of the light-incident-side polarizers 342 is formed of a film-shaped polarizer main body 3421 and a light transmissive substrate (transparent glass plate 3422 in the present embodiment) to which the polarizer main body 3421 is attached.

Configuration of Polarizer Accommodation Sections 361

A pair of polarizer accommodation sections 361 are formed at a front end portion of the optical part enclosure 36, and the pair of polarizer accommodation sections 361 protrude forward (toward liquid crystal panel 341) from both sides of the side surface of the optical part enclosure 36 that faces the liquid crystal panel 341, as shown in FIG. 10A. Slit grooves (not shown) are formed in the side surfaces of the polarizer accommodation sections 361 that face each other, and the slit grooves extend from the upper end of the side surfaces to a lower point thereof where the slit grooves come into contact with an inclined section 82 of the turbulence generator 8, which will be described later. The light-incident-side polarizer 342 is accommodated in the polarizer accommodation sections 361 by inserting right and left end portions of the glass plate 3422 into the slit grooves from the upper side and then causing the glass plate 3422 to slide toward the lower side. In this case, the light-incident-side polarizer 342 is so inserted that the polarizer main body 3421 of the light-incident-side polarizer 342 faces the liquid crystal panel 341.

Configuration of Turbulence Generator 8

In the present embodiment, the turbulence generator 8 is so disposed as to connect the pair of polarizer accommodation sections 361 to each other and so formed as to be in contact with the lower end of the accommodated light-incident-side polarizer 342 (in detail, lower end of glass plate 3422). Turbulence generator 8 in the present embodiment is formed of a plate-shaped inclined section 82, which has an inclined surface 821 so formed as to be inclined with respect to the light-incident-side polarizer 342, and plate-shaped protruding sections 81, which are formed on the inclined surface 821. The inclined section 82 forms not only the turbulence generator 8 but also the polarizer accommodation sections 361.

Configuration of Inclined Section 82

The inclined section 82 has the inclined surface 821, which faces the liquid crystal panel 341. The inclined section 82 (inclined surface 821) is so formed as to have a thick upper end portion in contact with the light-incident-side polarizer 342 and a thin lower end portion, as shown in FIG. 10B. The thickness of the upper end portion of the inclined section 82 is so formed as to be equal to the thickness of the glass plate 3422 of the light-incident-side polarizer 342 in the present embodiment. Further, the inclined section 82 is so formed that the upper end portion of the inclined surface 821 roughly coincides with the front surface of the glass plate 3422.

Configuration of Protruding Sections 81

The protruding sections 81 are disposed on the inclined surface 821. The protruding sections 81 are formed as plate-like, roughly-triangular-shaped protruding sections, as shown in FIGS. 10A and 10B, as in the case of the turbulence generator 6 according to the first embodiment. In detail, the protruding sections 81 are so formed as to be inclined by the inclination angle a of 15° with respect to the flow-in direction W1 of the cooling air W in a plan view of the light-incident-side polarizer 342. The protruding sections 81 are further so formed as to satisfy l=2h and p=3.3h as the relationship among the height "h" and the length "l" of the protruding sections 81 and the pitches "p" therebetween, as in the case of the protruding sections 61 in the first embodiment. In the present embodiment, 7 protruding sections 81 in total are arranged over the entire region of the inclined surface 821.

The thus configured turbulence generator 8 is blown with the cooling air W upward from the space below the turbulence generator 8, and the cooling air W flows into the turbulence generator 8. How the cooling air W flows along the turbulence generator 8 is the same as that in the first embodiment and will not therefore be described. The turbulence generator 8 disposed on the polarizer accommodation sections 361 of the optical part enclosure 36, which accommodate each of the light-incident-side polarizers 342, can provide the same advantageous effects as those provided by the first embodiment.

Fifth Embodiment

Figure 11A:
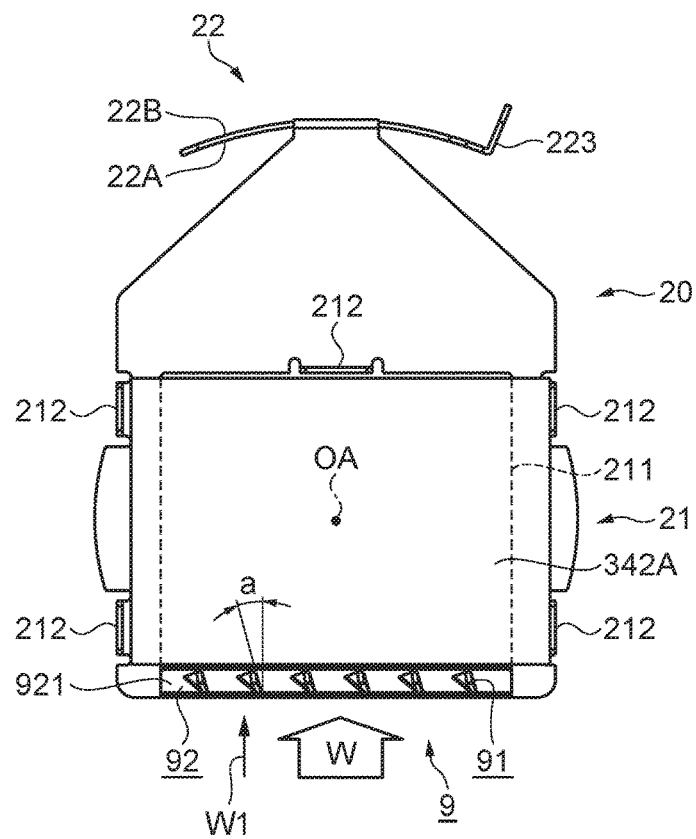
FIGS. 11A and 11B show that a polarizer holding member that holds a light-incident-side polarizer is provided with a turbulence generator according to a fifth embodiment.
Figure 11B:
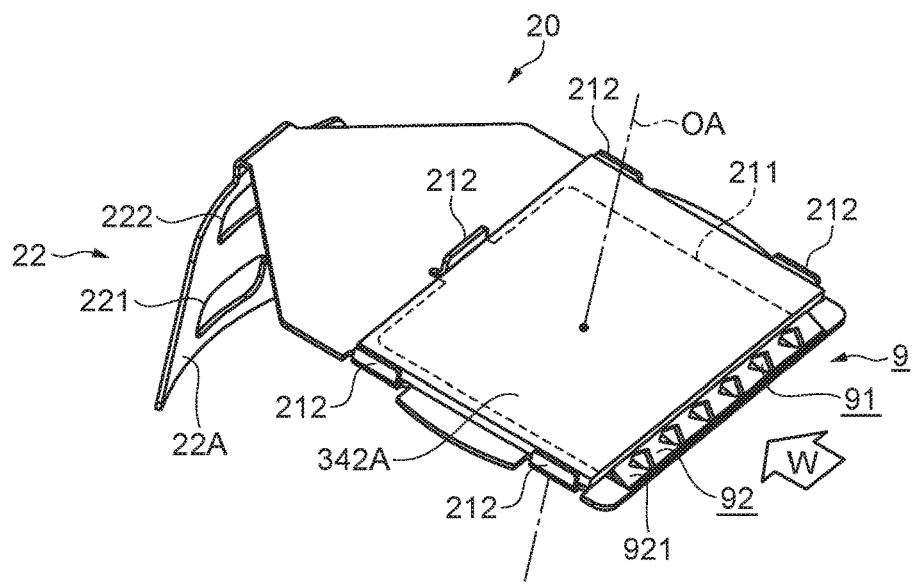

FIGS. 11A and 11B shows that a polarizer holding member 20, which holds a light-incident-side polarizer 342A, is provided with a turbulence generator 9 according to a fifth embodiment. FIG. 11A is a plan view, and FIG. 11B is a perspective view. FIG. 11A is a plan view in which the light-incident-side polarizer 342A and the polarizer holding member 20 are viewed from the front side. FIG. 11B is a perspective view in which the light-incident-side polarizer 342A and the polarizer holding member 20 are viewed from a front, upper right side.

Configuration of Polarizer Holding Member 20

The turbulence generator 9 in the present embodiment is disposed on the polarizer holding member 20, which holds the light-incident-side polarizer 342A. The polarizer holding member 20 is a member that adjusts the position of the light-incident-side polarizer 342A. Adjustment of the position of the light-incident-side polarizer 342A by using the polarizer holding member 20 for alignment of the polarization direction of the light-incident-side polarizer 342A with the incident polarized light outputted from the polarization converter 313 and therefore polarized in a predetermined direction prevents a decrease in light usage efficiency due to a shift of the position of the light-incident-side polarizer 342A.

The polarizer holding member 20 is formed of a metal-plate-shaped member in the present embodiment. The polarizer holding member 20 is formed of a holding section 21, which holds the light-incident-side polarizer 342A, and an adjustment section 22, which is formed by bending an upper end portion of the holding section 21 rearward along the illumination optical axis OA and curving the bent upper end portion around the illumination optical axis OA. The optical part enclosure 36 has a receiving section (not shown) formed in accordance with an inner circumferential surface 22A of the adjustment section 22. To perform the position adjustment, the adjustment section 22 is caused to slide along the receiving section.

Configuration of Holding Section 21

The holding section 21 is formed in a roughly rectangular shape in a plan view, and an upper portion of the holding section 21 extends in a triangular shape. A rectangular opening 211 is formed in the rectangular portion of the holding section 21. The holding section 21 further has side sections 212, each of which is bent forward and stands upright, along right and left peripheral portions that sandwich the opening 211 and along a peripheral portion on the upper side of the opening 211. The side sections 212 guide right and left peripheral portions and an upper peripheral portion of the light-incident-side polarizer 342A. Further, what is called cutting and raising in which cutting and bending are performed simultaneously is performed on the holding portion 21 to form an inclined section 92. Specifically, the inclined section 92 is formed by cutting and raising a peripheral portion on the lower side of the opening 211 forward with reference to a portion in the vicinity of the lower peripheral portion until the cut and raised portion is inclined by a predetermined angle. The cut and raised, upward-oriented peripheral portion of the inclined section 92 guides the lower peripheral portion of the light-incident-side polarizer 342A. The inclined section 92 forms the turbulence generator 9 in the present embodiment. The turbulence generator 9 will be described later in detail.

Configuration of Adjustment Section 22

The adjustment section 22 is generally so formed to have a rectangular shape in a plan view from above and is curved around the illumination optical axis OA, as described above. Two adjustment holes 221 and 222 are formed in the adjustment section 22 in parallel to each other along the illumination optical axis OA, and each of the adjustment holes 221 and 222 has a roughly-track-like shape having a circumferential direction extending along the radial direction of the curved shape. An adjustment side section 223, which is bent upward, is further formed at a left peripheral portion of the adjustment section 22.

Method for Configuring and Disposing Light-Incident-Side Polarizers 342A

Each of the light-incident-side polarizers 342A is the transmissive inorganic polarizer used in the third embodiment. The light-incident-side polarizers 342A in the present embodiment are therefore configured in the same manner as the light-exiting-side polarizers 343A (transmissive inorganic polarizers) in the third embodiment. In the present embodiment, each of the light-incident-side polarizers 342A is fixed to the polarizer holding member 20 in such a way that the surface on which the linear ribs are formed faces forward (light exiting side) and right and left portions of the opposite surface are attached to the surface surrounded by the four right and left side sections 212 of the holding section 21. After the light-incident-side polarizer 342A is fixed to the polarizer holding member 20, the upper front end of the cut and raised inclined section 92 is roughly flush with the light exiting surface (surface on which linear ribs are formed) of the fixed light-incident-side polarizer 342A.

Configuration of Turbulence Generator 9

The turbulence generator 9 in the present embodiment is formed of the plate-shaped inclined section 92, which is formed in the cutting and raising, and plate-shaped protruding sections 91, which are formed on the inclined section 92. The surface of the inclined section 92, which is formed in the cutting and raising, forms an inclined surface 921. The protruding sections 91 are formed, in the same manner as the inclined section 92 is formed, by cutting and raising the inclined section 92 forward (above inclined surface 921) in such a way that each cut and raised portion has a roughly triangular shape in a side view. The protruding sections 91 are so formed as to be roughly equal to the protruding sections 61 in the first embodiment. In the present embodiment, the protruding sections 91 are formed under the following conditions: The height h is 1 mm; the length l is 2 mm; the width w (thickness of plate that forms polarizer holding member 20) is 0.5 mm; and the pitch p is 3.3 mm. Further, the protruding sections 91 are so formed to be incline at the inclination angle a=15° with respect to the flow-in direction W1 of the cooling air W in a plan view, as shown in FIG. 11A. The inclination angle "a" is desirably set at an angle most suitable for generation of turbulence in consideration of the adjustment range over which the position of the light-incident-side polarizer 342A is adjusted.

The thus configured turbulence generator 9 is blown with the cooling air W upward from the space below the turbulence generator 9, and the cooling air W flows into the turbulence generator 9. How the cooling air W flows along the turbulence generator 9 is the same as that in the first embodiment and will not therefore be described. The turbulence generator 9 disposed in the polarizer holding member 20 can provide the same advantageous effects as those provided by the first embodiment.

Method for Adjusting Position of Light-Incident-Side Polarizers 342A

The polarizer holding member 20, which holds a light-incident-side polarizer 342A, specifically, the inner circumferential surface 22A of the adjustment section 22 is caused to come into, from above, contact with the receiving section (not shown) formed in the optical part enclosure 36. A portion of the receiving section that corresponds to the adjustment hole 221, which is formed in the adjustment section 22, has a threaded hole (not shown). A fixing screw (not shown) is inserted from above through the adjustment hole 221 in the adjustment section 22 disposed in the receiving section and temporarily screwed into (temporary fastened to) the threaded hole. In this state, the adjustment side section 223 is pressed in the rightward/leftward direction to cause the adjustment section 22 to slide relative to the receiving section. The position of the polarizer holding member 20 is thus adjusted and moved to a position where the ratio of the amount of light that has exited out of the light-incident-side polarizer 342A to the amount of light that has exited out of the polarization converter 313 and therefore has a predetermined polarization direction is maximized. The screw is then permanently screwed into the threaded hole to fix the adjustment section 22 to the receiving section. The series of actions described above allow adjustment of the position of the light-incident-side polarizer 342A.

Although not described in detail, the polarizer holding member 20 in the present embodiment is also used when the position of another optical part disposed in front of the light-incident-side polarizer 342A (for example, an optical part having a function of correcting the angle of view) is adjusted. In this case, the optical part is held by a member configured in roughly the same manner as the polarizer holding member 20 in the present embodiment is configured. The member is so disposed as to cover the front side of the polarizer holding member 20, the inner circumferential surface (not shown) of the adjustment section (not shown) of the member is fit on an outer circumferential surface 22B of the adjustment section 22, and the members fit on each other are caused to slide along the outer circumferential surface 22B for the position adjustment. A screw is then inserted through an adjustment hole (not shown) in a receiving section of the member and the adjustment hole 222 and screwed into a threaded hole provided in the receiving section to fix the member to the polarizer holding member 20 and the receiving section.

The invention is not limited to the embodiments described above, and a variety of changes, improvements, and other modifications can be made to the embodiments described above. Variations will be described below.

In the projector 1 according to the first embodiment described above, the plurality of protruding sections 61 of the turbulence generator 6 are formed at equal intervals defined by a predetermined pitch p=3.3 mm. The plurality of protruding sections 61, however, are not necessarily formed at equal pitches. For example, when a surface of an optical part has a region that is particularly desired to be cooled (region along which cooling air W is desired to flow), a plurality of protruding sections may be so arranged irrespective of the pitches that the cooling air is caused to flow along the region. Configuring the plurality of protruding sections 61 in a flexible manner as described above allows an increase in flexibility of how to allow the cooling air W to flow. The same holds true for the second to fifth embodiments.

In the projector 1 according to the first embodiment described above, the protruding sections 61 of the turbulence generator 6 are formed under the following conditions: l=2h; a=15°; and p=3.3h, where "a" represents the inclination angle of the protruding sections 61, "h" represents the height of the protruding sections 61 protruding from the inclined surface 621, "l" represents the length of the protruding sections 61 along the inclined surface 621, and "p" represents the intervals (pitches) between the protruding sections 61. The values described above in accordance with which the protruding sections 61 are formed are most efficient values that allow achievement of not only improvement in generation of turbulence and satisfactory fluidity of the cooling air but also reduction in the resistance. The relationship among the height "h", the length "l", the angle "a", and the pitch "p" is, however, not limited to the relationship described above. Further, the height "h", the length "l", the angle "a", and the pitch "p", in accordance with which the plurality of protruding sections 61 are formed, may vary. Configuring the plurality of protruding sections 61 in a flexible manner as described above allows an increase in flexibility of how to allow the cooling air W to flow. The same holds true for the second to fifth embodiments.

In the projector 1 according to the first embodiment described above, the protruding sections 61 of the turbulence generator 6 are so formed to be inclined by the predetermined inclination angle "a" (a=15°), and all the protruding sections 61 are inclined in the same direction. The protruding sections 61 are not necessarily formed this way. For example, the protruding sections 61 may be so formed that the right half and the left half of the protruding sections 61 are symmetric with respect to the upward/downward center line of the liquid crystal panel 341 to be cooled. The same holds true for the second to fifth embodiments.

In the projector 1 according to the first embodiment described above, each of the protruding sections 61 of the turbulence generator 6 is formed in a roughly triangular shape in a side view. The shape of the protruding sections 61 is, however, not limited to a triangular shape. The protruding sections 61 may be shaped in consideration of the ability, for example, to reduce resistance against the cooling air W resulting from the protruding sections 61 but generate turbulence. For example, the protruding sections may be formed in a shape having a curved line or a polygonal shape. The same holds true for the second to fifth embodiments.

In the projectors 1 according to the second and third embodiments described above, the turbulence generator 7 and the turbulence generator 7A are disposed on the light-exiting-side polarizers 343 and the light-exiting-side polarizers 343A, respectively. Targets to be cooled by the turbulence generator 7 and the turbulence generator 7A are, however, not limited to the light-exiting-side polarizers 343 or the light-exiting-side polarizers 343A. The turbulence generator 7 or the turbulence generator 7A may be disposed on the light-incident-side polarizers 342 to cool the light-incident-side polarizers 342.

In the projector 1 according to the fourth embodiment described above, the turbulence generator 8 is disposed in the lower region that accommodates the light-incident-side polarizers 342 to cool the light-incident-side polarizers 342. The target to be cooled by the turbulence generator 8 is, however, not limited to the light-incident-side polarizers 342. The turbulence generator 8 may instead be disposed in the lower region where the light-exiting-side polarizers 343 are disposed to cool the light-exiting-side polarizers 343. Instead, when the light-exiting-side polarizers 343 are held by a holding member separate from the optical part enclosure 36, the turbulence generator 8 may be disposed on the holding member separate from the optical part enclosure 36.

In the projectors 1 according the embodiments described above, the description has been made of the case where an optical part to be cooled is the light modulators (liquid crystal panels 341) or the polarizers (light-incident-side polarizers 342, 342A, light-exiting-side polarizers 343, 343A). The optical part to be cooled may instead be the polarization converter 313, which aligns the polarization directions of light with one another, a retardation plate, or any other optical part that generates heat when light is incident thereon. The life of the optical part can thus be prolonged.

In the projectors 1 according to the embodiments described above, the light source apparatus 30 employs the discharge-type arc tube 301. The light source apparatus 30 is not configured this way and may instead employ a solid-state light source. Examples of the solid-state light source may include a laser light source, an LED (light emitting diode) device, an organic EL (electro luminescence) device, a silicon-based light emitting device, or any of a variety of other solid-state light emitting devices.

In the projectors 1 according to the embodiments described above, the electro-optical apparatus 34 employs what is called a three-panel method using three light modulators corresponding to R light, G light, and B light. The electro-optical apparatus 34 is not necessarily configured this way and may employ a single-panel light modulator. Further, an additional light modulator for improving contrast may be employed.

In the projectors 1 according to the embodiments described above, the electro-optical apparatus 34 employs transmissive light modulators (transmissive liquid crystal panels 341). The electro-optical apparatus 34 is not necessarily configured this way and may employ reflective light modulators.

In the projectors 1 according to the embodiments described above, the electro-optical apparatus 34 employs the liquid crystal panels 341 as the light modulators. The electro-optical apparatus 34 is not necessarily configured this way and may, in general, employ any component that modulates incident light on the basis of an image signal, for example, a micromirror-type light modulator or any other type of light modulator. A DMD (digital micromirror device) can, for example, be employed as the micromirror-type light modulator.

In the projectors 1 according to the embodiments described above, the optical unit 3 employs a lens integrator system formed of the lens arrays 311 and 312 as the illumination optical apparatus 31, which homogenizes the illuminance of the light outputted from the light source apparatus 30. The optical unit 3 is not necessarily configured this way and can employ a rod integrator system formed of a light guide rod.

What is claimed is:

1. A projector in which light outputted from a light source apparatus is optically processed through an optical system having an optical part and resultant image light is projected, the projector comprising:
    a cooling fan that discharges cooling air toward the optical part as a target to be cooled;
    a holding member that holds the optical part; and
    a turbulence generator that
        is disposed at an upstream-side end portion of the optical part or the holding member in relation to the cooling air,
        converts the cooling air into turbulence, and
        causes the turbulence to flow toward the optical part, wherein
            the turbulence generator includes an inclined section having an inclined surface and a plate-shaped protruding section formed so as to protrude from the inclined surface, wherein
            the plate-shaped protruding section is inclined by an inclination angle such that the plate-shaped protruding section is not parallel with a plane in a y-direction, the y-direction being based on an x-y-z axis coordinate system, an x-y plane of the x-y-z coordinate system coinciding with a surface of the optical part, the inclination angle being on the x-y plane, and
            the y-direction of the x-y-z coordinate system corresponds to a direction in which the cooling air flows into the turbulence generator.

2. The projector according to claim 1, wherein the turbulence generator is disposed in a position upstream of an air flow separation point.

3. The projector according to claim 2, further comprising a plurality of protruding sections including the protruding section, each of the plurality of protruding sections being arranged adjacent to each other in a direction perpendicular to the flow-in direction of the cooling air.

4. The projector according to claim 3, wherein each of the protruding sections are formed in a roughly triangular shape in a side view, the side view being a view from a lower side of the turbulence generator.

5. The projector according to claim 3, wherein each of the protruding sections are formed so that a relationship of l=2h and p=3.3h is satisfied, where 'h' represents the height of the protruding section protruding from the inclined surface, 'l' represents the length of the protruding section along the inclined surface, and 'p' represents the intervals between the protruding sections.

6. The projector according to claim 3, wherein each of the protruding sections has a height that is 1 mm, a length that is 2 mm, and a width that is 0.5mm.

7. The projector according to claim 6, wherein a pitch between two of the plurality of protruding sections is 3.3 mm.

8. The projector according to claim 1, wherein the protruding section is formed under the following conditions: l=2h; and a=15° , where 'h' represents a height of the protruding section protruding from the inclined surface, 'a' represents the inclination angle, and 'l' represents a length of the protruding section in a direction along the inclination angle and the inclined surface.

9. The projector according to claim 8, wherein the optical part includes at least one of a polarizer, a retardation plate, a light modulator that modulates the light in accordance with image information, and a polarization converter that aligns polarization directions of the light with one another.

10. The projector according to claim 1, wherein each of the protruding sections is formed in a plate-like shape such that a width w of the protruding section in a plan view is smaller than a height of the protruding section in a side view, the side view being a view from a lower side of the turbulence generator, and the plan view being a bird's eye view of the turbulence generator.

* * * * *